US005816446A

United States Patent [19]

Steindorf et al.

[11] Patent Number: 5,816,446

[45] Date of Patent: Oct. 6, 1998

[54] DISPENSING A VISCOUS USE SOLUTION BY DILUTING A LESS VISCOUS CONCENTRATE

[75] Inventors: Richard E. Steindorf, Big Lake; Charles A. Hodge, Cottage Grove; Carleton J. Parker, St. Paul; Richard H. Johnson, West St. Paul, all of Minn.

[73] Assignee: Ecolab Inc., St. Paul, Minn.

[21] Appl. No.: 787,808

[22] Filed: Jan. 23, 1997

Related U.S. Application Data

[63] Continuation of Ser. No. 393,341, Feb. 23, 1995, abandoned.

[51] Int. Cl.$^{6}$ .......... G01F 11/00

[52] U.S. Cl. .......... 222/1; 137/891; 222/145.6; 222/145.8; 239/310

[58] Field of Search .......... 222/1, 129.1, 129.2, 222/145.5, 145.6, 145.7, 145.8; 239/310, 318; 137/888, 891, 896

[56] References Cited

U.S. PATENT DOCUMENTS

| | | | |
|---|---|---|---|
| 3,338,173 | 8/1967 | Meinert | 103/271 |
| 3,357,598 | 12/1967 | Kraft | 222/129.2 X |
| 3,643,688 | 2/1972 | Meinert | 222/129.2 X |
| 3,728,129 | 4/1973 | Sargeant | 99/78 |
| 3,887,497 | 6/1975 | Ulvild | 252/526 |
| 3,893,954 | 7/1975 | Tivin et al. | 252/548 |
| 3,949,903 | 4/1976 | Benasutti | 222/129.2 |
| 4,042,151 | 8/1977 | Uttech | 222/129.2 |
| 4,085,217 | 4/1978 | Kalopissis | 424/266 |
| 4,247,531 | 1/1981 | Hicks | 239/310 X |
| 4,474,307 | 10/1984 | Chappell | 222/1 |
| 4,726,944 | 2/1988 | Osipow et al. | 424/70 |
| 4,792,064 | 12/1988 | Loesel, Jr. et al. | 222/181 |
| 4,817,825 | 4/1989 | Freese | 222/129.2 |
| 4,856,676 | 8/1989 | Emody | 222/129.1 X |
| 4,978,036 | 12/1990 | Burd | 222/494 X |
| 4,981,582 | 1/1991 | Yoon et al. | 209/164 |
| 5,007,334 | 4/1991 | Kobes et al. | 99/483 |
| 5,033,649 | 7/1991 | Copeland et al. | 222/132 |
| 5,057,246 | 10/1991 | Bertho et al. | 252/545 |
| 5,196,139 | 3/1993 | Moschner | 252/186.25 |
| 5,230,253 | 7/1993 | Blaugh, Jr. et al. | 137/896 X |
| 5,232,632 | 8/1993 | Woo et al. | 252/546 |

(List continued on next page.)

FOREIGN PATENT DOCUMENTS

| | | | |
|---|---|---|---|
| 0 109 022 A | 5/1984 | European Pat. Off. . | |
| 314232 | 5/1989 | European Pat. Off. . | |
| 0441538 | 8/1991 | European Pat. Off. | 222/145.6 |
| 0 595 590 | 5/1994 | European Pat. Off. . | |
| 26 44 378 A | 4/1978 | Germany . | |
| 42 13 895 A | 11/1992 | Germany . | |
| 4-332511 | 11/1992 | Japan . | |
| 2 097 275 | 11/1982 | United Kingdom . | |
| 2 119 270 | 11/1983 | United Kingdom . | |
| 95/02664 | 1/1995 | WIPO . | |

OTHER PUBLICATIONS

K.–D. Bremecker, "The Role of Primary Alkanolamines", *Soap/Cosmetics/Chemical Specialties For Apr., 1992.*

*Primary Examiner*—Joseph Kaufman
*Attorney, Agent, or Firm*—Merchant, Gould, Smith, Edell, Welter & Schmidt P.A.

[57] ABSTRACT

An apparatus for diluting and dispensing a liquid concentrate with a liquid diluent to form a use solution wherein the use solution has a higher viscosity than either the concentrate or the diluent is provided. The apparatus includes an aspirator, a liquid diluent conducting path, a liquid concentrate conducting path, and a liquid conducting outlet path. The aspirator has a first inlet port, a second inlet port, and an outlet port. The first inlet port is connected to the liquid diluent conducting path for receiving a stream of the liquid diluent and the second inlet port is connected to the liquid concentrate conducting path for receiving a stream of the liquid concentrate at atmospheric pressure. The liquid conducting outlet is connected to the outlet port for dispensing the use solution from the apparatus. The geometry of the aspirator nozzle and the fluid passageways in the dispenser are adapted to a high viscosity dilute product.

67 Claims, 11 Drawing Sheets

U.S. PATENT DOCUMENTS 5,253,677 10/1993 Sand .......................... 137/888
5,255,820 10/1993 Thomas .......................... 222/1
5,259,557 11/1993 Spriggs .......................... 239/304
5,266,308 11/1993 Lee et al. .......................... 424/71
5,271,521 12/1993 Noss et al. .......................... 222/1
5,292,030 3/1994 Kateman et al. .......................... 222/1
5,301,718 4/1994 Bollhofner .......................... 137/893
5,324,765 6/1994 Mondet et al. .......................... 524/423
5,336,445 8/1994 Michael et al. .......................... 252/548
5,352,389 10/1994 Gazzani .......................... 252/544
5,376,310 12/1994 Cripe et al. .......................... 252/548
5,399,285 3/1995 Kanluen .......................... 252/174.23
5,445,226 8/1995 Scott et al. .......................... 239/318 X

DISPENSING A VISCOUS USE SOLUTION BY DILUTING A LESS VISCOUS CONCENTRATE

This is a Continuation of application Ser. No. 08/393,34, filed Feb. 23, 1995 now abandon.

FIELD OF THE INVENTION

The invention is related to a method and an apparatus for diluting and dispensing a liquid, preferable aqueous concentrate with a liquid, preferably aqueous diluent to result in a relatively more viscous, when compared to the concentrate, aqueous use solution. The claimed apparatus contains a unique flowpath geometry that ensures consistent, reliable and accurate dilution and dispensing of liquid concentrates. The unique flowpath geometry of the dilution apparatus or dispensers is adapted to the dilution of a liquid concentrate with a liquid diluent resulting in a use solution of substantially increased viscosity. The compositions of the invention are adapted to the dilution conditions found in the apparatus and methods of the invention to result in a substantially high viscosity for preferred end uses.

BACKGROUND OF THE INVENTION

Transportation costs associated with an aqueous diluent portion of a formulated aqueous product can be a significant part of the cost of aqueous liquid products as used at a use locus. Products, such as sanitizing or cleaning solutions, when used in large amounts can be expensive to use due to transportation costs associated with the aqueous portion. For this reason, many commodity liquid products are shipped from the manufacturers as an aqueous concentrate, an aqueous alcoholic concentrate or as a viscous concentrate to be diluted in a dispenser with an aqueous diluent at the use locus or site. For example, liquid detergents and cleaning solutions used in hospitality locations, institutional or industrial installations such as hotels, hospitals, restaurants, and the like are often shipped as liquid concentrates that are mixed and diluted using a dispensing device at an appropriate ratio to obtain a useful solution.

The dilution of concentrates can be done in many ways, varying from, on one hand, simply manually measuring and mixing to utilizing a computer-controlled dilution device. One common dilution mode involves utilizing a dispensing device that combines, under mixing conditions, a flow of concentrate and a flow of diluent. The flow of the liquid diluent can be directed through an aspirator such that, as the diluent passes through the aspirator, a negative pressure arises inside the aspirator drawing the liquid concentrate into the aspirator to mix with the liquid diluent. Both Copeland et al., U.S. Pat. No. 5,033,649 and Freese, U.S. Pat. No. 4,817,825 disclose dispensers having aspirators for diluting liquid concentrates to produce liquid products in this general way. Such aspirator-type dispensers have been used for diluting a liquid concentrate of any arbitrary viscosity with a low viscosity liquid diluent to produce a use solution of intermediate or low viscosity, i.e. the viscosity of the product falls arbitrarily between the viscosity of the concentrate and the diluent.

A use solution of high viscosity is often desirable. Increased viscosity can increase clinging ability to surfaces of an inclined or vertical substrate for more effective and prolonged contact. Examples of applications where cling is important includes manual dishwashing detergents, hand cleaners, sanitizing toilet bowl cleaners, delimers, oven/grill cleaners and degreasers, etc. Some of such relatively viscous use solution can be made by diluting a low viscosity liquid concentrate with a low viscosity liquid diluent to form a very high viscosity dilute product.

Conventional aspirator systems are designed for a decrease in viscosity upon mixing a diluent and a concentrate and at best operate intermittently when provided with a high viscosity (50–2500 cP) concentrate. Such a conventional dispenser can also fail to accommodate a viscosity increase upon dilution to a use solution product with a viscosity of about 200–4000 cP. The typical dispenser has a standard aspirator with a venturi nozzle outlet and a throat opening to a downstream passageway for mixing the blended liquid derived from the aspirator nozzle and source of concentrate. Such a dispenser has venturi in close proximity to the throat, typically 3 mm or less, and has a diameter ratio of the diameter of the nozzle outlet to the diameter of the opening of the downstream passageway that generally falls between 1:1 and 1:1.4. This size ratio is adapted to dispensing low to medium viscosity concentrates in a diluent stream to form a use solution having a viscosity less than the typical liquid concentrate. Generally, the distance between the nozzle outlet and the throat in the prior art dispenser is about 2 mm or less. In a high viscosity product dispenser, made from a lower viscosity concentrate, failure can occur when the concentrate mixes with the diluent. The viscosity of the concentrate and the increase in viscosity can prevent flow through the dispenser that obtains proper aspirator action. Alternately the high viscosity of the concentrate or the use solution can prevent the correct operation of the aspirator. In this failure mode the diluent can pass through the dispenser with little or no concentrate pickup or mixing. A substantial viscosity increase can result in poor mixing, an intermittent flow or a blockage of flow through the dispenser. Further, even if the flow of use solution does not stop completely, the use solution may not be produced (or dispensed) over time at a consistent dilution or flow rate.

A substantial need exists to provide a dispenser that can dispense and dilute a concentrate in a dilute solution that exhibits a viscosity greater than the concentrate. The preferred dispenser of this invention will create a use solution of high viscosity, will consistently mix diluent and concentrate, will provide a controllable dilution ratio and will provide a consistent flow of use product. The invention solves these problems by using a diluting dispenser or apparatus having a novel internal sizing adapted to the viscosity changes that occur during the dilution resulting in the consistent and accurate production of a use solution of higher viscosity than either the liquid concentrate or the liquid diluent.

SUMMARY OF THE INVENTION

The invention provides a method and an apparatus for diluting a liquid concentrate with a liquid diluent to form a use solution wherein the use solution has a higher viscosity than either the concentrate or the diluent (i.e., neither the liquid concentrate nor the liquid diluent is as viscous as the use solution). The viscosity of the use solution increases to greater than twice the viscosity, preferably a four to ten fold increase in viscosity, of the greater of the diluent or the liquid concentrate. The apparatus, which is sized and configured to provide a dynamic liquid seal, includes an aspirator that produces reduced pressure to draw the concentrate using the flow of diluent, such as service water, once the dynamic liquid seal is established. The aspirator is sized and adapted to continuously draw a concentrate stream into a diluent stream and causing a mixing at a consistent dilution ratio. The outlet means is sized and configured to maintain a dynamic liquid seal made by diluting a concentrate to form a more viscous use solution (or a dynamic use solution volume comprising a thickened dilute use solution) in the outlet means. The dynamic liquid seal comprises a portion of the venturi and outlet means that is filled and maintained in a filled condition by diluted high viscosity product. With no dynamic liquid seal in place, the aspirator cannot effectively draw concentrate for mixture in the diluent. The typical aspirator/venturi cannot generate the dynamic seal reliably with a concentrate that becomes more viscous upon dilution. The aspirator is constructed with a flow-altering, flow-diverting, flow-limiting or turbulence creating device that can create the dynamic seal to insure that the dynamic liquid seal is created at the instant diluent flow is initiated in the portion downstream of the throat and ending at the use solution outlet. With no liquid seal the aspirator will often not draw liquid concentrate. The dynamic liquid seal prevents intermittent, inaccurate mixing and flow in the mixing chamber. Because of the seal the mixing chamber remains effectively or substantially filled with fluid to ensure proper dilution and flow during dispensing.

The aspirator has a restriction device that increases the rate of flow of the diluent at the venturi with a proportional pressure difference to draw the concentrate into the aspirator. The aspirator also comprises a liquid diluent conducting means, a liquid concentrate conducting means, and a viscous diluted product conducting outlet means. The aspirator can also comprise a first inlet port, a second inlet port, and an outlet port. The first inlet port is associated with the venturi restriction device and is connected to the liquid diluent conducting means for receiving a stream of the liquid diluent. The second inlet port is connected to the liquid concentrate conducting means for receiving a stream of the liquid concentrate at atmospheric pressure.

The dispensing device can comprise multiple concentrate inlet ports (two ports for two concentrates, three parts for three concentrates, etc.). The viscous liquid diluted product conducting outlet means is connected to the outlet port for dispensing the use solution from the apparatus. The outlet port and the liquid conducting outlet means are sized in relation to the flow rates of the liquid diluent and the liquid concentrate through the first inlet port and the second inlet port such that the flow rate of the use solution from the apparatus is substantially unaffected by the viscosity of use solution.

Referring to the accompanying drawing, wherein the figures are not drawn to scale in order to show certain details and wherein like reference numerals represent like corresponding parts in the several views.

Figure 9:
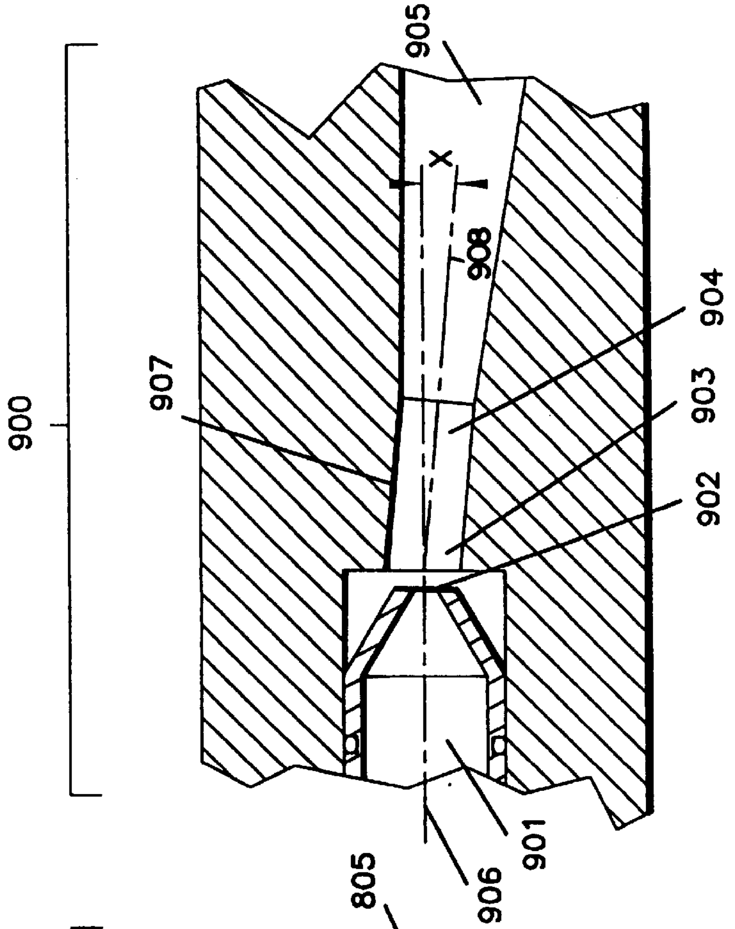
Figure 8:
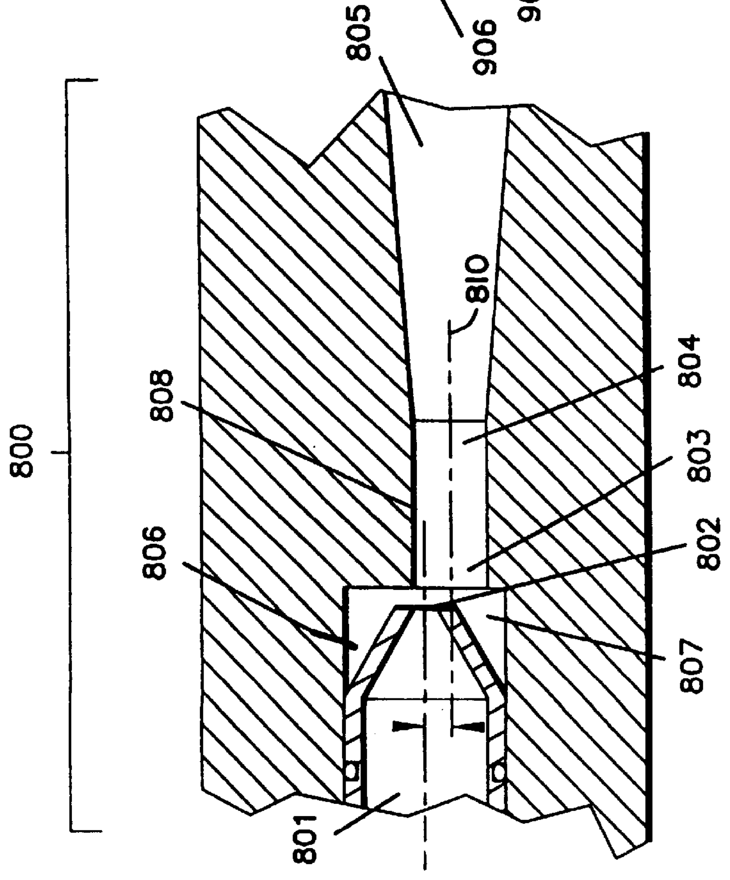

FIG. 8 is a cross-sectional diagram of an aspirator configuration showing a nozzle offset from the outlet portion of an aspirator having a throat end of user portion downstream. The offset of the nozzle causes flow interruption or a direction in the fluid flow direction or turbulence downstream of the aspirator that promotes the formation of the dynamic liquid seal; and FIG. 9 shows a cross-sectional diagram of an aspirator having a nozzle input and a downstream throat portion wherein the throat has an angle with respect to the direction of fluid flow from the aspirator nozzle. The angled flow when in contact with the throat causes flow changes, turbulence or other effect resulting in the dynamic liquid seal.

Figure 10:
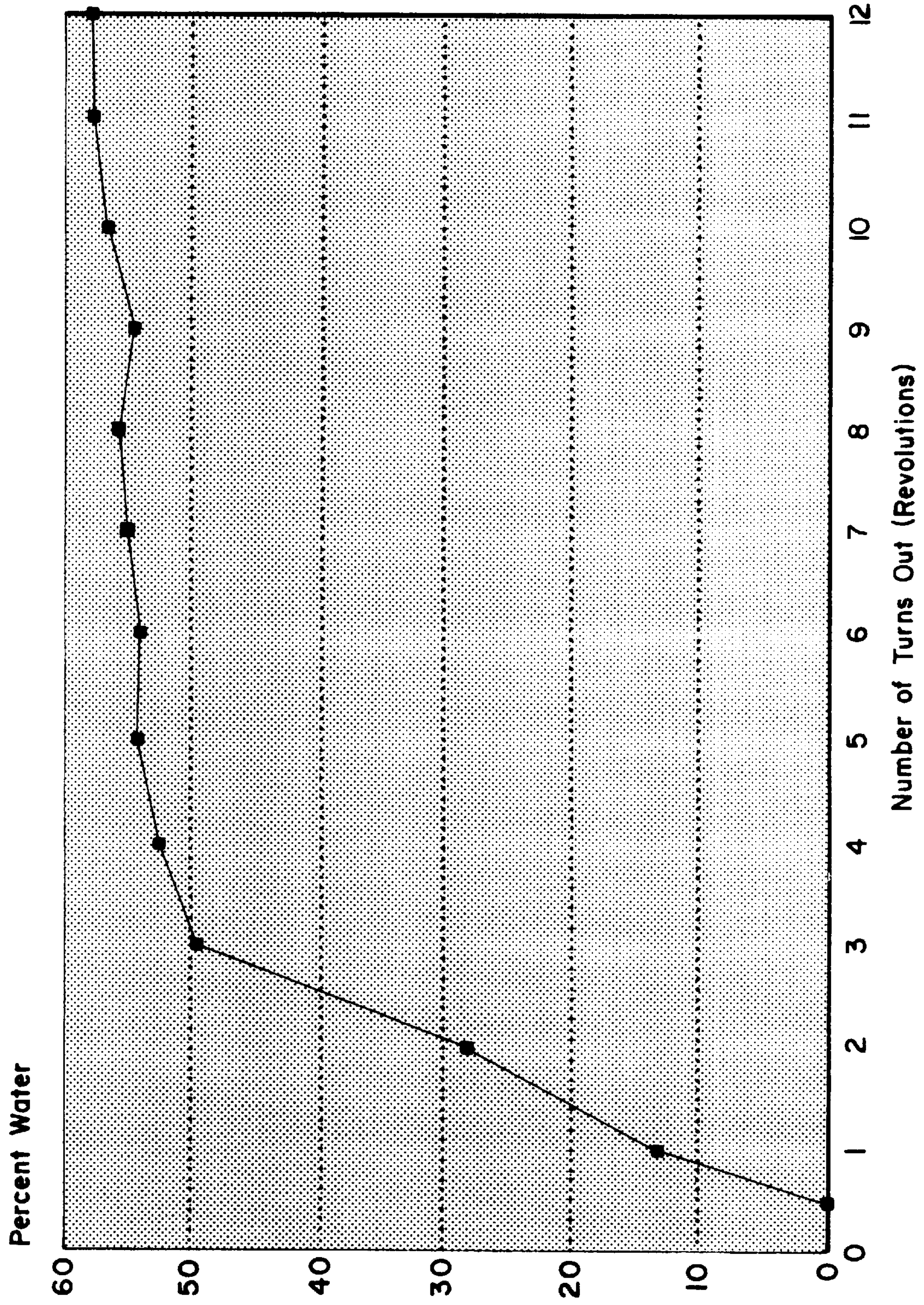
Figure 11:
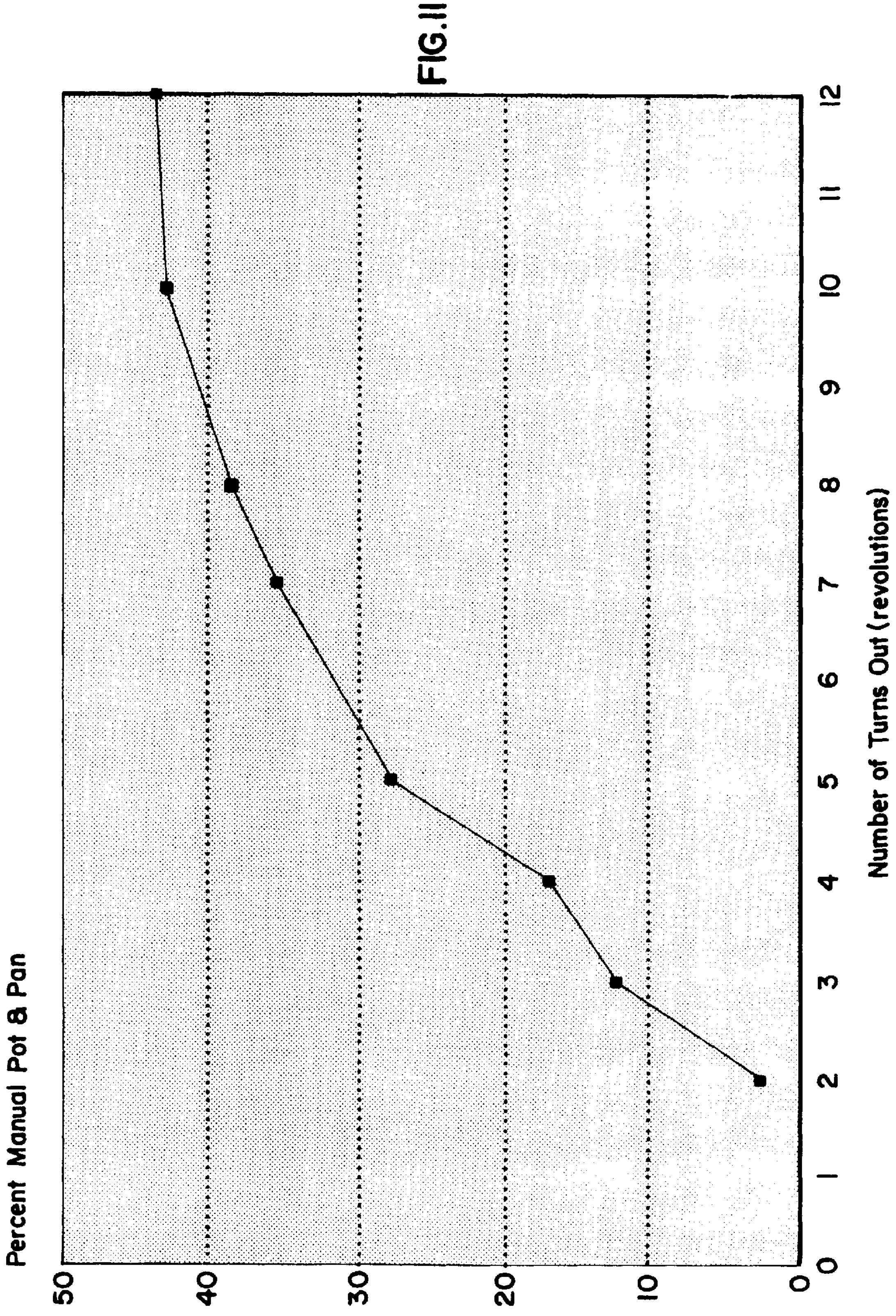

FIGS. 10 and 11 are graphical representations of the ability of the adjustable distance from the aspirator nozzle to the throat of the device of the invention (see FIG. 7) to dispense a varying proportion of diluent to concentrate as the nozzle/throat distance is adjusted.

The present invention further provides a method and an apparatus for diluting and dispensing a liquid concentrate with a liquid diluent to form a use solution wherein the apparatus includes an aspirator, a liquid diluent conducting means, a liquid concentrate conducting means, and a liquid conducting outlet means. The aspirator has a first inlet port, a second inlet port, and an outlet port. The first inlet port receives a stream of the liquid diluent from the liquid diluent conducting means and the second inlet port receives a stream of the liquid concentrate from the liquid concentrate conducting means at atmospheric pressure. The aspirator also has a venturi restriction device having a passageway having an inlet opening and a converging portion with a end connected to an outlet port downstream of the inlet opening. The aspirator venturi (FIG. 1) further has a nozzle 60 associated with the first inlet port 20 directing a jet of the liquid diluent into the throat 80 of a passageway 81. The jet is directed through a chamber 54 filled concentrate. The jet draws concentrate into the throat 80 and into passageway 81 filled by the dynamic liquid seal. The ratio of the diameter of the opening of the throat 80 to the diameter of the outlet opening (i.e., exit) of the nozzle 60 is greater than 1.4:1 preferably greater than 2:1. The liquid conducting outlet means is connected to the outlet opening to dispense the use solution. The liquid conducting outlet means 52 has a flow restriction means 24 with an opening whose area is smaller than the area of the outlet port 86 (FIG. 1) for altering restricting flow from the outlet port of the aspirator. Other flow altering or restriction means can be used.

In a preferred embodiment, the diluent stream having a viscosity about equal to the viscosity of distilled water or of deionized water (up to about 100 cP, centipoise measured with a Brookfield viscometer as discussed below), is directed into internal components of the aspirator comprising a preferably conical venturi restriction device. The narrowing diameter from the larger diameter input to the smaller diameter output of the conical restriction device substantially increases the rate of flow and a proportional pressure drop at the narrow conical outlet immersed in the concentrate. The narrow conical outlet is surrounded by and in fluid contact with the liquid concentrate having a viscosity of about 10–1000 cP, preferably 10–600 cP.

The relationship between concentrate viscosity and dilute use solution viscosity is shown in the table

TABLE

| | CONCENTRATE | USE SOLUTION |
|---|---|---|
| Visc Range | 10–1000 cps | 100–4000 cps |
| Pref. Visc Range | 10–600 | 100–2000 |
| Most Pref. Vis Range | 100–400 | 200–1200 |

The concentrate inlet is generally positioned in fluid communication with the exterior of the conical restriction device and nozzle such that the reduced pressure and increased flow rate draws concentrate into the diluent stream exiting the conical outlet. The conical outlet is also positioned in liquid communication with a throat leading to a fluid output. In the fluid output chamber, the diluent and concentrate streams combine to form a mixed stream that increases in viscosity after mixing. The final dilute product has a final viscosity, that is greater than either of the liquid concentrate or the diluent, of 100–4000 cP, preferably 100–2000 cP, most preferably 200–1200 cP. The liquid output mixing chamber is sized and configured such that the generally circular cross section of the mixing chamber is sized and adapted to the viscosity of the viscous diluted product. Upon initiation of fluid flow, the diluent and liquid concentrate mix and, with an appropriately shaped outlet with a flow limiting device, the dynamic liquid seal is created by a turbulent or a complex flow. The dynamic liquid seal forms in the volume between throat 80 and restriction means 24. Depending on the nature of the diluent and concentrate, the viscosity can increase at an essentially instantaneous rate or at a very substantial rate. Because of the nature of the product viscosity, the mixing chamber generally conforms to a conical shape with a relatively narrow inlet and a relatively wide outlet.

In a preferred mode, the dimensions of the restriction inlet and outlet, the dimensions of the mixing chamber inlet and outlet are important with respect to obtaining controllable dilution ratios and obtaining consistent flow of a product with a controllable constant product dilution.

A preferred method of dispensing a relatively viscous cleaning liquid is also provided by the present invention. The method includes providing a body of a liquid concentrate in fluid communication with a passageway or a mixing chamber; delivering a jet of a liquid diluent through an opening into the mixing chamber or passageway at a velocity sufficient to create a decrease in pressure at the opening to educe thereinto a flow of the liquid concentrate from the body of the liquid concentrate such that the liquid concentrate merges with the jet of liquid diluent in the passageway creating a dynamic liquid seal; mixing the liquid concentrate with liquid diluent to mix and dilute the liquid concentrate with the liquid diluent to create a diluted use solution that wherein the viscosity of the use solution is higher than either the liquid concentrate or the liquid diluent; and delivering the relatively viscous cleaning liquid to a desired use location. The delivering rate of the relatively viscous cleaning liquid in the method is substantially unaffected by the viscosity of the liquid concentrate.

The apparatus of the present invention can be advantageously employed to dispense a viscous use solution by diluting a liquid concentrate less viscous than the use solution with a compatible liquid diluent. In operation, the apparatus of the present invention can be easily controlled to dispense such a use solution of consistent composition at a desired rate by selecting the liquid concentrate flow rate. This significantly saves time and effort in adjusting the apparatus when different concentrates of different viscosities are diluted at different times using the same apparatus.

The apparatus of the invention also has a substantial advantage that consistent uninterrupted accurate dilution can occur even at relatively low line pressure. The typical operating range for the apparatus of the invention ranges from about 15 to about 40 psi and higher depending on geographic location. Many dispensers fail to operate at lower line pressure, 10–20 psi or 10–15 psi. The apparatus of this invention has the unique advantage of providing accurate dilution of concentrate to high viscosity use solutions with no reduction in efficiency, accuracy or consistency. Dilution ratios achievable by the apparatus of the invention can range across a broad spectrum. The dilution apparatus can be used to dilute concentrate at relatively low dilution ratios (10 parts diluent per part of concentrate) to relatively high concentrations of concentrate (up to 3 parts diluent per part of concentrate) about 10% dilution to about 33% dilution based on total volume can be achieved. The preferred dilution ratios of the apparatus of the invention range from about 15% to about 30%, most preferably about 20% (5:1) to about 25% (4:1).

Aspirators of a design for a use solution with a lower viscosity than the concentrate will typically fail to operate because of the substantially higher viscosity created as the liquid diluent is mixed with the liquid concentrate. Such a dispenser can tend to fail to draw concentrate and mix. With no modification of typical dispenser venturi and outlet compartments, the diluent can be directed in a spray that does not initiate concentrate flow and does not create a dynamic liquid seal. By increasing the size of the throat passageway and the diffuser to allow the viscous use solution to exit and by providing an effective flow diversion, flow altering or turbulence creating back pressure inducing device with a restricting means so that the jet of liquid diluent can be slowed and its kinetic energy used to effectuate mixing, consistent flow through the aspirator is achieved.

By utilizing conduits of sufficiently large size downstream of the restriction means, the dynamic liquid seal in the aspirator is created by dynamic flow in a volume to be dependent on the size of the restriction means and not significantly affected by the conduit downstream of the flow changing means. This further facilitates effective control of the composition and dispensing rate of the use solution. Likewise, the relatively large size of the liquid concentrate conducting means allows the liquid concentrate to be aspirated into the aspirator without causing significant pressure loss. This in turn allows the continuous and consistent dispensing of use solution largely independent of the viscosity of the liquid concentrate.

DESCRIPTION OF THE EMBODIMENTS

The methods and apparatus of the invention are used to dispense chemical systems that thicken upon dilution. Such chemical systems are highly concentrated materials formed in a diluent or base solvent. Such diluents or solvents can include water, aqueous alcoholic blends or alcoholic blends.

Materials are typically thickened using common thickening mechanisms. The only requirement is that upon dilution the viscosity increases. The viscosity increase upon dilution is a result of the interaction between a surfactant in the concentrate and its interaction with aqueous media resulting in a range of physical transformations due to concentration, molecular structure and interaction with ionic or salt-like species in the diluted aqueous medium. At low concentrations (below the critical micellar concentration) a surfactant can exist as a discrete dissociated molecule in solution. At increased concentration, micelles form and with subsequent concentration increases, surfactant will orient itself into condensed meso phases. Such an intermediate phase (known as mesomorph) exhibit an ordered structure depending on long range order and intermicellar spacing. Increased concentration, which causes formation of the middle phase or meso phase can render the use solution gel-like in character and substantially increased in viscosity. The use of glycols, alcohols and other micelle, inhibiting additives permits the use of high concentrations of surfactants currently found in concentrates which upon dilution with water yield viscous diluted products. The structure of this surfactant as well as the nature of the additives used in the concentrate ultimately determines the viscosity of the diluted use solution at a given concentration. Linear alkyl sulfates increase the viscosity more than branched chain-based analogs, due to their greater tendency for intermolecular cohesiveness and lower critical micellar concentration. Similarly, the same rationale applies to the strong viscosity building effects of alkanolamides derived from fatty acids. Viscosity of such materials can be raised through an ionic interaction based on the use of salt or by an increase in a surfactant concentration, the effect being greater in the presence of amides. Excess salt may, however, lead to a diminution of viscosity after reaching a viscosity maximum. The salt effect in increasing concentration of diluted product relates to the compression of the electric double layer existing at the charged micellar surface to the reduction in charge effect leading to lowered repulsive intermicellar forces. The micelle no longer restricted to its spherical shape can now grow into a cylindrical shape by including within the micellar structure an increased number of surfactant ions. Spheres can move freely in solution because of reduced packing density, but cylinders have restricted lateral and translational movement, resulting in increased viscosity. Increasing the viscosity through the use of alkanolamides and ionic additives is a common practice, and it has been demonstrated that the alkanolamide having the lowest solubility will have the greatest effect. The obvious factors affecting solubility include the length of the alkyl chain, the distribution of alkyl groups per any given chain length and the type and number of hydrophilic groups on the amide. The choice of the optimum viscosity-enhancing agents also influenced by selection of an additive that exhibits good cold stability. Thus a more polar additive such as diethanolamide, can be expected to have better cold storage behavior than the corresponding monoethanolamide. The viscosity of surfactant system is also governed by choice of neutralizing cation in the following order triethanolamine, diethanolamine, monoethanolamine, sodium. For reasons of viscosity control in the concentrate, 2-amino-2-methyl-1-propanol is a preferred neutralizing cation. The 2-amino-2-methyl-1-propanol gives fluid viscosities while other inorganic or organic bases can result in gel formation.

The chemical systems can generally be a surfactant based, generally neutral system, an acid based system containing compatible surfactant cosolvents and other additives, alkaline systems containing compatible surfactants, cosolvents, etc.

Generally, neutral surfactant based systems are commonly based on an aqueous or aqueous alcoholic solvent system and can use a variety of surfactants, thickeners, dyes, fragrances, etc. to form the compositions of the invention. Useful solvent systems include methanol, ethanol, propanol, isopropanol, ethylene glycol, propylene glycol, polyethylene glycol, polypropylene glycol and others. Suitable surfactants are discussed below.

Typical acid systems are typically aqueous or aqueous solvent based systems containing an effective amount of an acid cleaning material. Both organic and inorganic acids can be used. Typical examples of useful acids include hydrochloric, phosphoric, acetic, hydroxyacetic, benzoic, hydroxybenzoic, glycolic (hydroxyacetic), succinic, adipic, and other well known acid systems. These materials can be used in combination with well known compatible surfactant systems, thickeners, dyes, cosolvents, etc. to form a fully functional material. Surfactants used in such systems are discussed below.

Alkaline systems are commonly aqueous or aqueous solvent systems combined with a source of alkalinity. Highly alkaline and moderately alkaline sources can be used. A highly alkaline sources include sodium hydroxide, potassium hydroxide, etc. providing a large concentration of hydroxide ($OH^-$) in aqueous solution. Lower or moderate alkalinity materials include various sodium and potassium silicates, sodium and potassium phosphates, sodium and potassium carbonates, sodium and potassium bicarbonates, ammonium hydroxide, monoethanol amine, triethanol amine, and other well known sources of alkalinity. Such basic materials can be combined in a compatible aqueous systems with well known surfactants to form a fully functional alkaline cleaner. Surfactants are discussed below.

The composition of the invention also generally comprises a surfactant. This surfactant may include any constituent or constituents, including compounds, polymers and reaction products. Surfactants function to alter surface tension in the resulting compositions, assist in soil removal and suspension by emulsifying soil and allowing removal through a subsequent flushing or rinse. Any number of surfactants may be used including organic surfactants such as anionic surfactants, cationic surfactants, nonionic surfactants, amphoterics and mixtures thereof.

Anionic surfactants can be useful in removing oily soils. Anionic surfactants useful in the invention include sulfates, sulfonates, and carboxylates such as alkyl carboxylates salts, among others. Exemplary anionic surfactants, include alkyl sulfates and sulfonates, alkyl ether sulfates and sulfonates, alkyl aryl sulfates and sulfonates, aryl sulfates and sulfonates, and sulfated fatty acid esters, among others. Preferred anionic surfactants include linear alkyl sulfates and sulfonates, and alkyl aryl sulfates and sulfonates. More preferably the alkyl group in each instance has a carbon chain length ranging from about $C_{6-18}$, and the preferred aryl group is benzyl.

Nonionic surfactants which have generally been found to be useful in certain optional formulas of the invention are those which comprise ethylene oxide moieties, propylene oxide moieties, as well as mixtures thereof. These nonionics have been found to be pH stable in acidic environments, as well as providing the necessary cleaning and soil suspending efficacy. Nonionic surfactants which are useful in the invention include polyoxyalkylene nonionic surfactants such as $C_{8-22}$ normal fatty alcohol-ethylene oxides or propylene oxide condensates, (that is the condensation products of one mole of fatty alcohol containing 8–22 carbon atoms with from 2 to 20 moles of ethylene oxide or propylene oxide); polyoxypropylene-polyoxyethylene condensates having the formula $HO(C_2H_4O)_x(C_3H_6O)_yH$ wherein $(C_2H_4O)_x$ equals at least 15% of the polymer and $(C_3H_6O)_y$ equals 20–90% of the total weight of the compound; alkylpolyoxypropylene-polyoxyethylene condensates having the formula RO- $(C_3H_6O)_x(C_2H_4O)_yH$ where R is a $C_{1-15}$ alkyl group and x and y each represent an integer of from 2 to 98; polyoxyalkylene glycols; butyleneoxide capped alcohol ethoxylate having the formula $(R(OC_2H_4)_y(OC_4H_9)_xOH$ where R is a $C_{8-18}$ alkyl group and y is from about 3.5 to 10 and x is an integer from about 0.5 to 1.5; benzyl ethers of polyoxyethylene and condensates of alkyl phenols having the formula $R(C_6H_4)$ $(OC_2H_4)_xOCH_2C_6H_5$ wherein R is a $C_{6-20}$ alkyl group and x is an integer of from 5 to 40; and alkyl phenoxy polyoxyethylene ethanols having the formula $R(C_6H_4)$ $(OC_2H_4)_xOH$ wherein R is a $C_{8-20}$ alkyl group and x is an integer from 3 to 20. Two specific types of nonionic surfactants have been found to be preferable as effective soil suspending agents in the solid and cleaning composition of the invention. First, polyoxypropylene-polyoxyethylene block polymers have been found to be useful in the invention. These polymers generally have the formula:

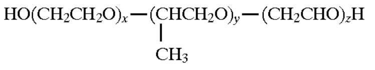

in which on the average x=0–150, preferably, 2–128, y=0–150, and preferably 16–70, and z=0–150, and preferably, 2–128. More preferably, the polyoxypropylene-polyoxyethylene block copolymers used in the invention have a x=2–40, a y=30–70 and a z=2–40. Block nonionic copolymers of this formula are desirable for various applications due to the reduced foaming characteristics these provide. A second and preferred class of nonionic surfactants which is useful in the invention and desirable for other applications are alcohol ethoxylates. Such nonionics are formed by reacting an alcoholate salt (RO—Na+) wherein R is an alcohol or alkyl aromatic moiety with an alkylene oxide. Generally, preferred alkoxylates are C1–12 alkyl phenol alkyloxylates such as the nonyl phenol ethoxylate which generally have the formula:

$$R\text{–}C_6H_4\ (OCH_2CH_2)_nOH$$

$$C_9H_{19}C_6H_4\ (OCH_2CH_2)_nOH$$

where R is alkyl and n may range in value from 6 to 100. Nonyl phenol ethoxylates having an ethoxylate molar value ranging from about 6 moles to 15 moles have been found preferable for reasons of low foaming character and stability in the acidic environment provided by the composition of the invention.

One particularly useful surfactant for use in these systems include the amine oxide surfactants. Useful amine oxide surfactants have the formula:

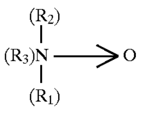

wherein $R_1$ is a $C_8$–$C_{20}$-alkyl or $C_8$–$C_{20}$-alkylamido-$C_2$–$C_5$-alkyl group and $R_2$ and $R_3$ are individually $C_1$–$C_4$-lower alkyl or hydroxy-$C_1$–$C_4$-lower alkyl. Preferably $R_2$ and $R_3$ are both methyl, ethyl or 2-hydroxyethyl. Preferred members of this class include lauryl(dimethyl)amine oxide (Ninox® L, Stephan Chemical Co., Northfield, Il), cocodimethyl amine oxide (Ninox® C), myristyl(dimethyl)amine oxide (Ninox® M), stearyl(dimethyl)amine oxide (Schercamox® DMS, Scher Chemicals, Inc., Clifton, N.J.), coco(bixhydroxyethyl)amine oxide (Schercamox® CMS), tallow(bis-hydroxyethyl)amine oxide and cocoamidopropyl (dimethyl)amine oxide (Ninox® CA). Although in alkaline solutions these surfactants are nonionic, in acidic solutions they adopt cationic characteristics. Preferably, the amine oxide surfactants will comprise about 1–15% of the present compositions, most preferably about 2–10%. Cationic surfactants may also be used in the acid cleaner of the invention.

The cleaners of the invention can contain an antibacterial agent, a fungicide, an antiyeast agent or antiviral agent or any combination thereof. The selection is dependent upon end use. A combination of antiviral agent and an antibacterial agent may be preferred in certain applications. Examples of useful antimicrobial agents include parachloro-metaxylenol (PCMX), chlorhexidiene gluconate (CHG), trichlosan, alcohol, iodophores, povidone iodine, Nonoxynol-9™, phenolic compounds, gluteraldehyde, quaternary compounds, etc. Quaternary ammonium compounds are also useful as antimicrobials in the invention are cationic surfactants including quaternary ammonium chloride surfactants such as N-alkyl($C_{12-18}$) dimethylbenzyl ammonium chloride, N-tetradecyldimethylbenzyl ammonium chloride monohydrate, N-alkyl($C_{12-4}$) dimethyl 1-napthylmethyl ammonium chloride available commercially from manufacturers such as Stepan Chemical Company.

The composition can also comprise an organic or inorganic sequestering agent, preferably about 1 wt-% to 15.0 wt-%. Suitable sequestering agents include alkali metal phosphates, polyphosphates, metaphosphates, and the like. Preferably the sequestering agent comprises a sodium tripolyphosphate. Organic sequestering include aminopolycarboxylic acids such as ethylenediamine tetraacetic acid hydroxy carboxylic acids such as gluconic, citric, tartaric, and gamma-hydroxybutyric acid, etc.

Figure 1:
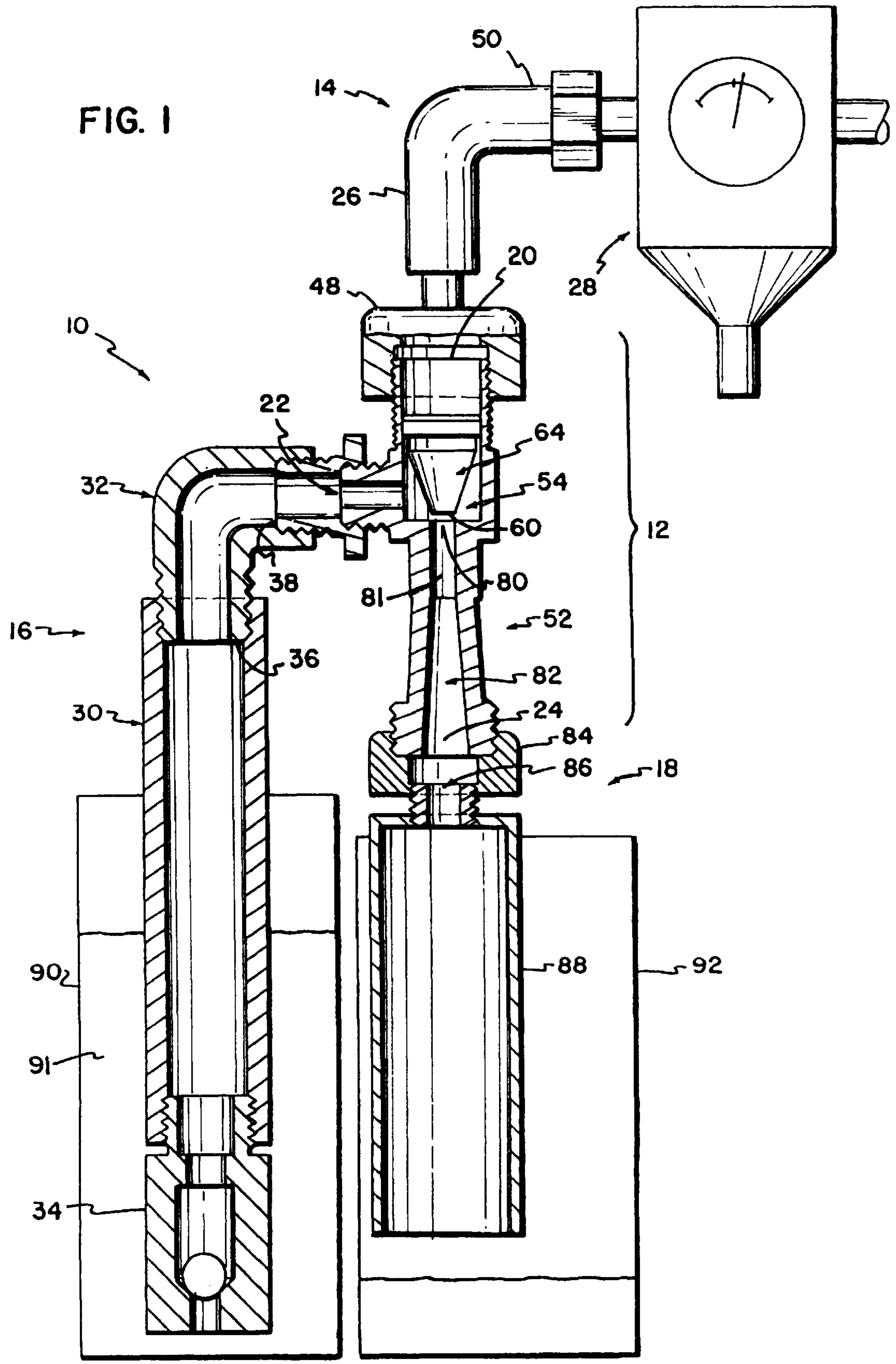
FIG. 1 shows a cross-sectional view of a preferred embodiment of the apparatus of the invention.

Referring to FIG. 1 of the drawings, a preferred embodiment illustrative of the apparatus of the present invention for diluting a liquid concentrate with a liquid diluent is indicated generally at 10. The apparatus 10 includes an aspirator assembly 12 operatively connected and in fluid communication with a liquid diluent conducting means 14 (e.g., a conduit such as a pipe for supplying tap water), a liquid concentrate conducting means 16 (e.g., a conduit such as a pipe for supplying a relatively viscous liquid concentrate), and a liquid product conducting outlet means 18 which can include a conduit such as a tube or pipe. The aspirator 12 has diluent inlet port 20 for connecting to and in fluid communication with the diluent conducting means 14, and one or more concentrate inlet ports 22 for connecting and in fluid communication with the concentrate conducting means 16, and an outlet port 24 for conducting and in fluid communication with the liquid conducting outlet means 18.

The liquid diluent conducting means 14 preferably is a pipe 26 for supplying water under adequate venturi enabling pressure of, for example, 10 to 40 psig, preferably 30 to 40 psig ($1\times10^5$ Newtons/$m^2$). One surprising aspect of the aspirator is its ability to deliver a constant, consistent, accurate dilution at low line pressures of about 10–15 psi. The water pressure preferably is regulated by a water pressure regulator 28 which is connected to the pipe 26 at an upstream position thereof. Referring to FIG. 1, the liquid concentrate conducting means 16 of the preferred embodiment preferably has a pipe 30 (tubing or other conduits can also be used) operatively connected to and in fluid communication with the liquid concentrate 91 (in a container 90) and the aspirator 12 via an L-shaped connector 32.

A check valve 34 is connected to the pipe 30 at the end thereof distal to or upstream from the aspirator 12. The size of the check valve 34, pipe 30, and the L-shaped connector 32 are selected to reduce, and preferably minimize, the pressure loss (pressure drop) between the check valve 34 and the inlet 22, in the apparatus 10 during transportation of the liquid concentrate therethrough. Depending on the orientation of the apparatus 10 and the application, the L-shaped connector 32 is optional. For example, the pipe 30 and the L-shaped connector 32 can be replaced with a flexible tubing to provide a smooth and gradual curve so as to reduce the pressure loss due to sudden changes of flow direction caused by the change of the internal diameter at the pipe fitting points 36,38, etc. and by the L-shape of the L-shaped connector. Preferably, the maximum internal diameter of the liquid concentrate conducting means 16 is substantially greater than the inlet port 22 for the liquid concentrate, most preferably the ratio is 2:1 (i.e. the area ratio is 4:1). Preferably, the length of the liquid concentrate conducting means 16 is minimized to reduce pressure drop or pressure loss during fluid flow therein.

Figure 2:
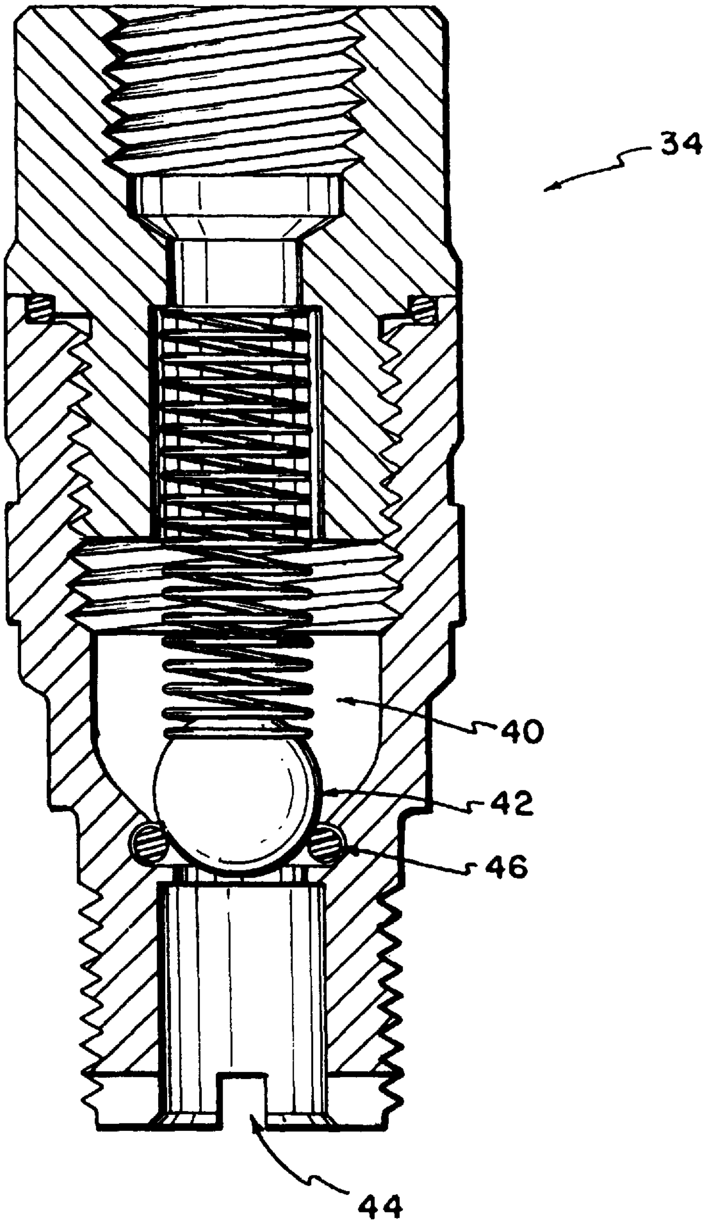
FIG. 2 shows a cross-sectional view of a ball check valve that can be applicable in the embodiment shown in FIG. 1.

Referring to FIG. 2, the check valve 34 can be a ball check valve having a spring 40 for biasing the ball 42 towards the inlet 44 of the check valve. When the liquid concentrate is not being aspirated, the ball 42 rests on a seat 46 to seal against back flow of liquid toward the inlet 44 of the check valve 34. Such a check valve has the advantage that it can be used even though the orientation of the check valve is different from a vertical position. Preferably, the check valve is a springless gravity-based ball check valve to minimize pressure drop caused by a spring. In operation, the check valve is preferably vertically oriented so that the ball falls by gravity on the seat to prevent back flow of the liquid concentrate when aspiration is stopped. Such a springless gravity-based ball check valve will have a configuration, except for the spring, substantially similar to FIG. 2. In such a case, the springless ball can substantially more dense than the ball 42 used with a spring 40 in FIG. 2, wherein a spring biases the ball downward (and toward the inlet of the check valve).

The ball in the springless gravity-based ball check valve is made of a material of higher density (i.e. specify gravity) than that of the liquid concentrate. Preferably, the density of the ball is selected so that the ball causes little pressure loss and yet once aspiration stops will fall back on the seat to seal against back flow. For a liquid concentrate of density from 0.95 to 1.25 grams per mL, the density of the ball is greater than about 1.3 grams per mL preferably greater than about 2.0 grams per mL. More preferably, the ball of the ball check valve is a ceramic ball because of its density and its corrosion resistance. However, other materials can also be used for making the ball. For example, stainless steel balls with nonsolid cores (e.g., containing voids) to achieve the desirable density can also be used.

One preferred mode of operating the supply of concentrate into the aspirator involves the use of a diaphragm check valve. The diaphragm check valve operates to provide the same function as the ball check valve by preventing flow of the concentrate away from the aspirator. As is generally known, a diaphragm valve operates on a principle of inducing a flexible diaphragm, or diaphragm portions into a sealing abutment with a seating arrangement, usually of metal or other rigid materials such as plastic, composite, etc. The diaphragm rubber is generally comparatively thin in sections and can have a peripheral strengthening insert or can be comparatively hard. Since the periphery of the diaphragm or diaphragm portions must meet with and seal with the surface or internal diameter of a seating arrangement, the diaphragm periphery must be relatively rigid to ensure a close fit and seal.

Such diaphragm valves taken as a whole typically have a relatively circular form matching a relatively circular seat. However, in certain embodiments, the diaphragm can be made of two, three, four or more lobes. In operation each lobe operates to open the valve by moving away from the seat under the influence of a flow of liquid through the valve. As the flow ceases or flow in an opposite direction is initiated, the valve or valve portions can then be forced against the seat sealing the valve and interrupting flow. The diaphragm valve can have a spring arrangement that forces the diaphragm or diaphragm portions against the seat causing some force to be exerted against the valve before valve opening occurs. However, in the application of this invention, a springless diaphragm valve is preferred. Further, for the applications of this invention a two or three lobed diaphragm valve is preferred.

Referring again to FIG. 1, the liquid diluent conducting means 14 is connected and in fluid communication with the inlet port 20 of the aspirator 12 via an optional adapter 48. The liquid diluent conducting means 14 is sized so that the liquid diluent at the inlet port 20 of the aspirator 12 has sufficient pressure to force a jet of liquid diluent to exit the opening 60 of nozzle 64 at a velocity adequate for causing aspiration of the liquid concentrate through the liquid concentrate conducting means 18. Preferably, the pressure of the liquid diluent at the inlet port 20 of the aspirator 12 for receiving a stream of liquid diluent is about 10 to 60 psig preferably 20 to 40 psi ($7\times10^4$ to $1\times10^5$ Newtons/$m^2$ above atmospheric pressure) but operation can work at 10–15 psi.

A pipe 26 (or tubing and the like) is connected to an adaptor 48 to supply the liquid diluent to the aspirator 12. The end 50 of the pipe 26 distal to the aspirator is operatively connected to a pressure regulator 28 for regulating the pressure of the liquid diluent to a desired pressure, 10 to 60 psi is workable without a regulator, preferably between 20 to 40 psig, while 10 to 15 psig is operable. The regulator 28 in turn is connected to a supply of liquid diluent (not shown). Preferably, the pipe 26 is made of a relatively rigid material, such as copper, steel, polyvinyl chloride, and the like to enhance stability of the apparatus when in operation.

The aspirator 12 has an liquid outlet portion 52 oriented generally in the same direction as the flow of the liquid diluent and perpendicular to the direction of the flow of liquid concentrate into the aspirator. In the aspirator 12 is also a chamber 54 connected to and in fluid communication with the liquid diluent inlet port 20, the liquid concentrate inlet port 22, and the outlet portion 52. The outlet portion 52 of the aspirator 12 has a throat 80, a passageway 81 and a diffuser portion 82. The end of the diffuser 82 distal (downstream) to the chamber 54 is proximate (upstream) to the outlet port 24 of the aspirator. The conical nozzle 64 is disposed in the aspirator 12 downstream and proximate the liquid diluent conducting means 14 of the aspirator so that the liquid diluent enters the chamber 54 through the nozzle outlet 60.

Figure 3:
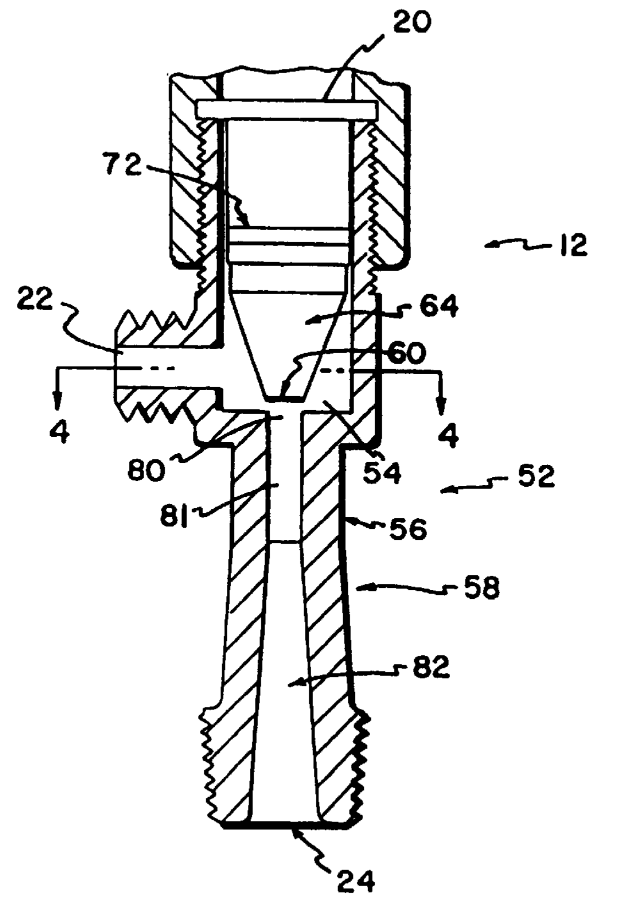
FIG. 3 shows a cross-section of the aspirator of FIG. 1.
Figure 5:
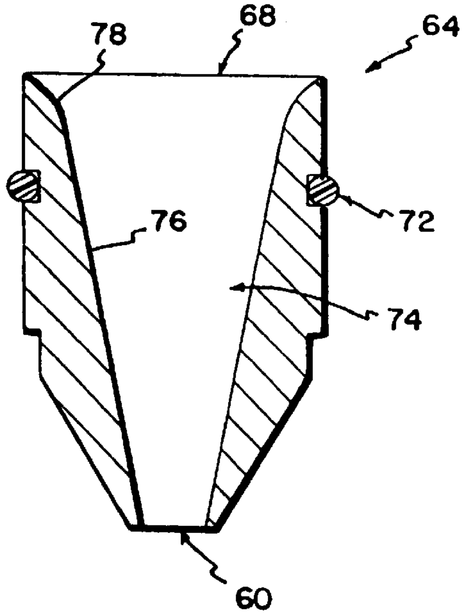
FIG. 5 is a longitudinal cross-sectional view of the nozzle of the aspirator of FIG. 3.

Referring to FIG. 3 and 5, the nozzle 64 in the aspirator of the preferred embodiment of FIG. 1 has an inlet end 68 and an outlet end 60 and preferably has an O-ring 72 sealing against fluid leak around the nozzle. A nozzle passageway 74 connecting the two ends 68, 60 is defined within the nozzle. Preferably, the internal wall 76 of the nozzle 64 provides a continual and smooth convergent geometry to accelerate the liquid diluent to result in a jet of liquid diluent exiting the nozzle. Preferably, the inlet end 68 of the nozzle has a diameter of less than about 5 cm, preferably 0.5 to 4 cm. The internal surface 76 of the nozzle has a configuration such that a bell-shaped inlet 78 is provided so as to give a smooth transition for fluid passage and enhance mechanical integrity of the inlet end 68 of the nozzle. This also provides an inlet opening of the nozzle having essentially the same diameter as the internal diameter of the liquid diluent inlet port 20. The angle of convergence and the internal diameter of the exit opening (i.e. opening of the outlet end 60) of the nozzle are selected such that the liquid diluent jet exiting the nozzle has a velocity and shape effective for impacting the wall of the passageway of the throat portion 80, passageway 81 and the diffuser portion 82 for aspiration and mixing of the liquid concentrate.

Figure 4:
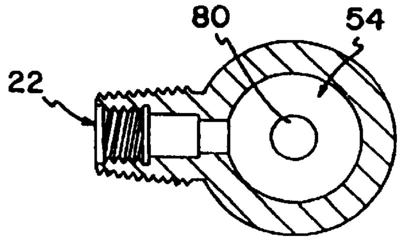
FIG. 4 shows a cross-section in portion of the aspirator along the line 4—4 of FIG. 3, not showing the nozzle.

Referring to FIG. 3, FIG. 4, and FIG. 5 the outlet end 60, having a diameter of 0.1 to 6 mm, preferably 0.2 to 5 mm, most preferably about 1 to 4 mm, of the nozzle 64 extends past the liquid concentrate inlet port 22 into the chamber 54 from the liquid diluent inlet port 20 at an angle about 90° to the direction of flow of the liquid concentrate. The outlet end 60 of the nozzle faces a throat or opening 80. The throat 80 is sized independently from nozzle 60 and has a diameter of 1 to 10 mm, preferably 2 to 9 mm, most preferably 3 to 7 mm. The throat 80 leads into a passageway 81 which leads to the diffuser 82 and the outlet port 24 of the aspirator 12 such that the jet of liquid diluent exiting the chamber 54 generally passes axially into the outlet portion 52 of the aspirator. The distance between the downstream and of the opening 60 and the closest portion of the throat or opening 80 is important as this distance increases from zero clearance the efficiency of the dispenser increases linearly until the distance is about 10 mm, preferably less than 8 mm. After the distance increases past this dimension the dispenser efficiency drops but remains about the same.

In operation, as the jet of liquid diluent enters the throat portion 80 and the passageway 81 and impacts the wall of the passageway 81 and diffuser 82 when it encounters some resistance in flow or flow turbulence, the dynamic liquid seal is formed. Within the seal (dynamic volume), liquid enters and pushes the liquid within the passageway towards the outlet port 24, thereby creating a negative pressure within the chamber 54 relative to the atmospheric pressure outside the aspirator 12. This causes the liquid concentrate to be aspirated and drawn into the apparatus 10 through the liquid concentrate conducting means 16 (i.e., the L-shaped connector 32, the pipe 30, and the ball check valve 34). The diameter ratio of the opening 80 into the passageway 82 to the diameter of the opening of the outlet end 60 nozzle is selected to be effective to cause aspiration of the liquid concentrate when the liquid diluent is forced through the apparatus. Preferably, the diameter ratio of the opening 80 into the passageway to the opening nozzle outlet 60 is greater than about 1.4:1, preferably greater than 2.0:1 more preferably between about 2.0 to 3.5:1, and even more preferably about 2.0–3.0:1.

The throat portion 80 leading to the passageway 82, can have a constant diameter. However, the throat portion 81 can also diverge from the opening 80 to provide a turbulence or decreasing linear velocity as the liquid passes through the passageway 82 in contact with the wall in the passageway. The diameter of the opening 80 into the passageway 82 and the diameter of the throat portion 81 of the passageway are selected to allow for an increase in viscosity as the liquid concentrate and the liquid diluent are mixed so that liquid does not back up the passageway 82 into the chamber 54. The opening 80 can have a non-circular cross-section to aid in forming the dynamic liquid seal. The cross-section can be oval, ellipsoidal, triangular, rectangular, etc. With the area ratio of the nozzle outlet opening to the passageway opening properly selected, the angle of divergence of the diffuser 82 of the passageway 81 as well as the length of the throat portion 81 and the length of the diffuser portion of passageway 82 can be sized with conventional Venturi designed methods. Generally, the angle of divergence of the diffuser portion diverts about 1–50° from the flow path of liquid. The outlet port 24 of the aspirator, at the end of the divergent portion of the passageway 82, is connected to the liquid conducting outlet means 18 for dispensing the use solution from the apparatus.

Referring again to FIG. 1, the outlet port 24 of the aspirator 12 is connected to an outlet adaptor 84 connected to a restriction means 86 in fluid communication with the passageway. The restriction means can be adjustable to regulate back pressure optimizing dispensing characteristics. The restriction means 86 in FIG. 1 is a metering orifice having an internal diameter smaller than the internal diameter of the outlet port 24. The end of the metering orifice 86 distal to the aspirator 12 is connected to a conduit 88, preferably a pipe, directed to a container 92. The container 92 can fill with the dilute use solution and can be selected to conform to the proportion of the product. The conduit 88 is preferably left at room pressure and is not immersed in product. The conduit can also be a tubing, an L-shaped connector, a trough, or other means of conveying fluids.

The restriction means 86 provides a nominal back pressure within the aspirator 12 to overcome the effect of the larger than conventional area ratio of the opening to the passageway 82 to the nozzle outlet opening so that aspiration can result. Because of the large size of the opening into the passageway and the large size of the throat relative to the size of the jet exiting the nozzle, without the restriction means 86, the jet may pass through the passageway 82 and exit the aspirator without substantially impacting the wall of the throat, passageway or the diffuser (i.e., divergent portion) of the aspirator. With the presence of the restriction means (i.e., the metering orifice), liquid (which can include both the liquid concentrate and the liquid diluent, as well as mixtures thereof) impacts the wall of the passageway 82 and can create the dynamic liquid seal from input 22 through restriction means 86, the diluted concentrate flows toward the outlet port 24, thereby creating a negative pressure within the chamber 54 as the liquid in the passageway exits the passageway and the aspirator.

The restriction means 86 can be a nipple, a short piece of tubing, an orifice (e.g. a metering orifice), or other means of resisting the flow diverting flow, creating turbulence, altering flow, etc., that is leaving the exit port of the aspirator. However, the size and shape of the restriction means 86 is selected so that it does not result in an excessive back pressure that can cause substantially reduced liquid flow. Preferably, the internal diameter of the restriction means 86 (more preferably a metering orifice) is less than about 0.9 times the diameter of the opening of outlet port 24 of conduit 88 and the length of restriction means 86 is relative short (for example, about equal to the diameter of the opening into the passageway) so that the back pressure is not significantly affected by the length. In order not to create an excessive back pressure, the pipe 88 connected to the metering orifice 86 preferably has a relatively large diameter. The diameter ratio of the pipe 88 relative to the internal diameter of the metering orifice is greater than 1.3:1, preferably 1.5:1 to 3.5:1. The flow passageway within the aspirator 12 from opening 80 into throat 81 through passageway 82 can also be sized and configured to create the dynamic liquid seal.

Figure 3A:
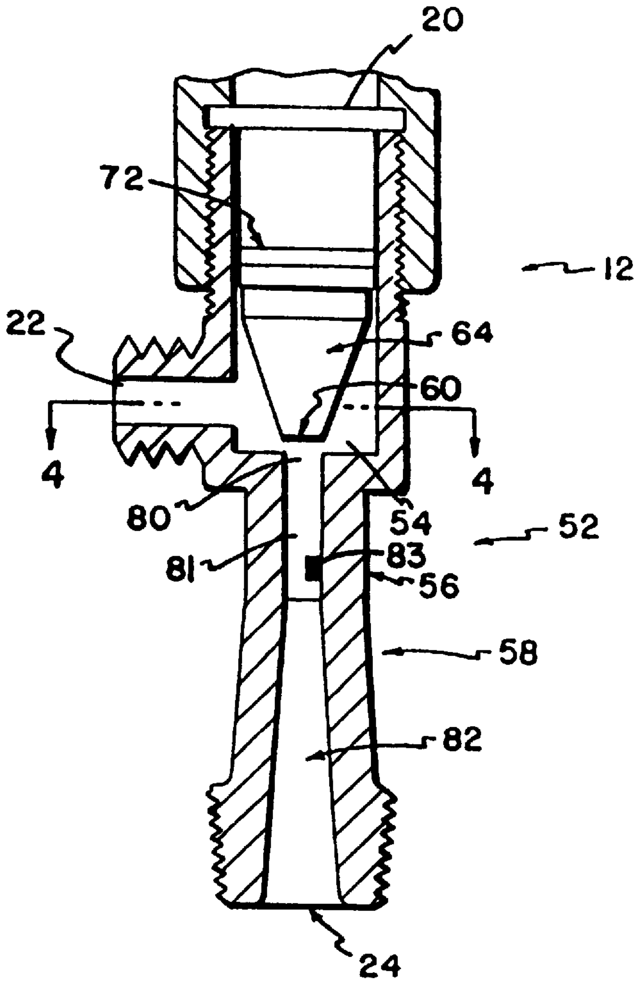
FIGS. 3A, 3B and 3C show a flow limiting or turbulence creating means in the outlet path.
Figure 3B:
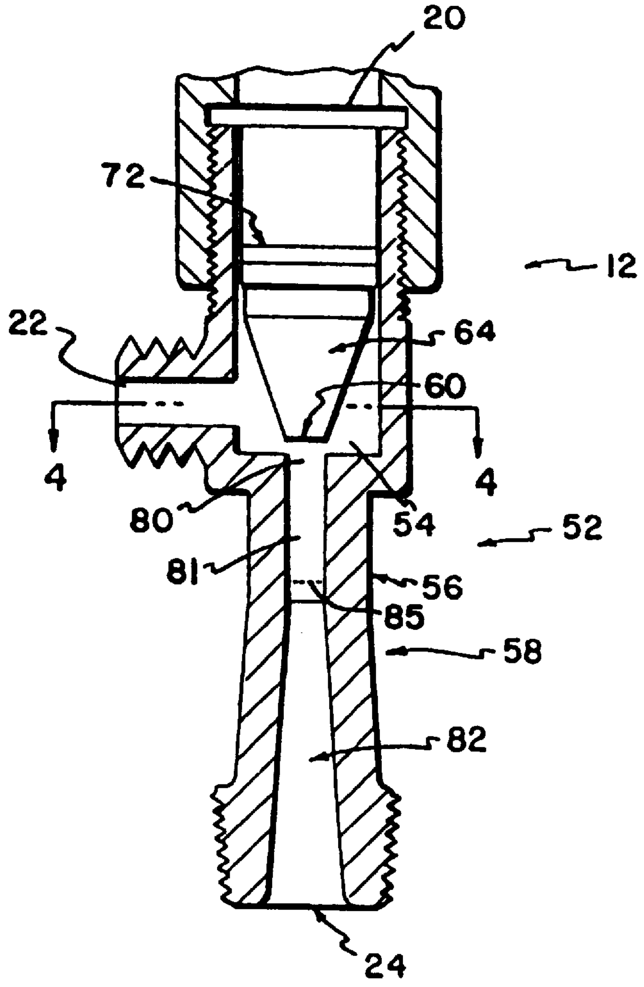
Figure 3C:
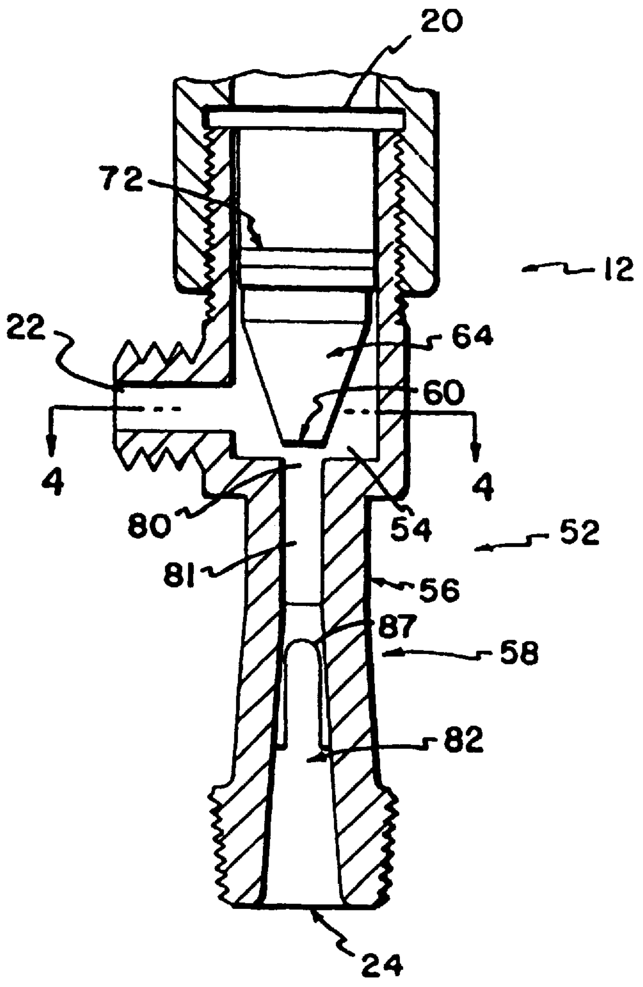

When the dynamic liquid seal is created by an alternate geometry of the throat 80, passageway 81 and diffuser 82, the restriction means 86 is not required, but can be also used. FIG. 3A shows cylindrical insert 83 introduced into the flow in throat 80 or passageway 81. As the liquid jet flows and contacts the insert 83, substantial turbulence is caused resulting in the highly viscous diluted concentrate to fill the throat 80 and continue to flow through the throat 80 and fill into the passageway 81. In this way, the dynamic liquid seal is created by the interaction of the flow of the dilute concentrate with the insert 83 through the throat 80 and passageway 81. In similar fashion, FIG. 3B shows a screen 85 across the passageway 81. The screen 85 in the flowpath of the liquid diluted concentrate creates some back pressure and turbulence at the outlet end of the screen portion, thereby creating the dynamic liquid seal that fills the throat portion 80 and the passageway 81. FIG. 3C shows a separate embodiment of means to introduce the dynamic liquid seal in the throat portion 80 and the passageway 81. A curved wire insert 87, anchored in the walls of the diffuser 82, imposed in the liquid path of the diluted concentrate as it flows through the venturi can cause turbulence and/or back pressure resulting in the creation of the dynamic liquid seal.

In use, preferably, the pressure 28 regulator regulates the pressure of the incoming liquid diluent to a pressure of about 10–40 psi, preferably 30–40 psi but can operate as low as 10–15 psig ($1\times10^5$ Newtons/$m^2$). This pressure forces the liquid diluent through the pipe 26, adaptor 48, the nozzle 64 and its outlet 60. The liquid diluent exits the nozzle 64 at the outlet opening 60 thereof as a jet directed through opening 80 into the throat 81 of the aspirator 12. As previously stated, the jet fills throat 81 and passageway 82 and pushes the liquid within the passageway towards the metering orifice 86, causing a negative pressure in the passageway 82 relative to the outside of the aspirator. The negative pressure caused by the jet in the passageway 82 is transmitted through the chamber 54, the liquid concentrate inlet port 22, the L-shaped connector 32, the pipe 30, and the check valve 34, causing the liquid concentrate in a container 90 at atmospheric pressure to be aspirated into the aspirator. Because of the relatively large internal diameter of the check valve, pipe, and L-shaped connector, as the liquid concentrate flows into the aspirator, there is little pressure loss. Preferably, the viscosity of the liquid concentrate and the slow flow rate of concentrate due to the large internal diameter of the pipe results in laminar flow of the liquid concentrate in the pipe, which in turn results in little pressure loss in the liquid concentrate conducting means 16. Subsequently, the liquid concentrate enters the chamber 54, passes through the opening into the passageway to contact and mix with the liquid diluent.

As the jet of liquid diluent impacts liquid within the passageway 82, the high velocity (and therefore high kinetic energy) of the jet causes turbulent fluid movement and mixing of the liquid concentrate and the liquid diluent within the passageway. As the liquid passes along the diffuser (i.e., divergent) portion of the passageway 82, because of the increasing diameter of the diffuser portion toward the outlet port 24, the linear velocity of the liquid stream therein decreases, thereby transferring the kinetic energy of the fluid into mixing action, causing the liquid diluent and liquid concentrate to mix, resulting in the use solution. The mixed liquid diluent and liquid concentrate have high viscosity. Because of the size of the throat portion 81 and divergent portion of the passageway 82 are selected to facilitate the flow of such an increased viscosity liquid, the resulting liquid passes out of the passageway through the outlet adaptor 84 and the metering orifice 86. The resulting liquid (i.e., use solution) then passes through the pipe 88 of the liquid conducting outlet means 18 into a container 92.

Because the nozzle 64, the throat 80 into the passageway 81 and the diffuser portion 82 of the passageway, the liquid concentrate conducting means 16, and the liquid conducting outlet means 18 are sized to accommodate an increased fluid viscosity within the passageway 82 so that liquid concentrates of a range of viscosities can be aspirated into the aspirator. The dispensing rate of the use solution is independent of the viscosity of the liquid concentrate. The present apparatus can be useful for diluting a liquid concentrate with a viscosity of 10 to 1000 cP (Brookfield viscosity at 22° C. as defined below) to result in a use solution with a viscosity of 100 to 4000 cP preferably 100 to 2000 cP at 22° C.

Referring to FIG.1, in use, the aspirator 12 is operatively connected to the pipe 26 supplying the liquid diluent, the pipe 30 supplying the liquid concentrate, and through the adaptor 84 to the flow restrictor or metering orifice 86, which in turn is connected to the pipe 88 delivering the use solution to a container 92. The pressure and flow rate of the liquid diluent is controlled to cause the liquid concentrate to be aspirated into the aspirator and mix with the liquid diluent at a desired rate. The resulting use solution is dispensed into the container 92. The composition and flow rate of the use solution can be thus controlled.

Figure 6:
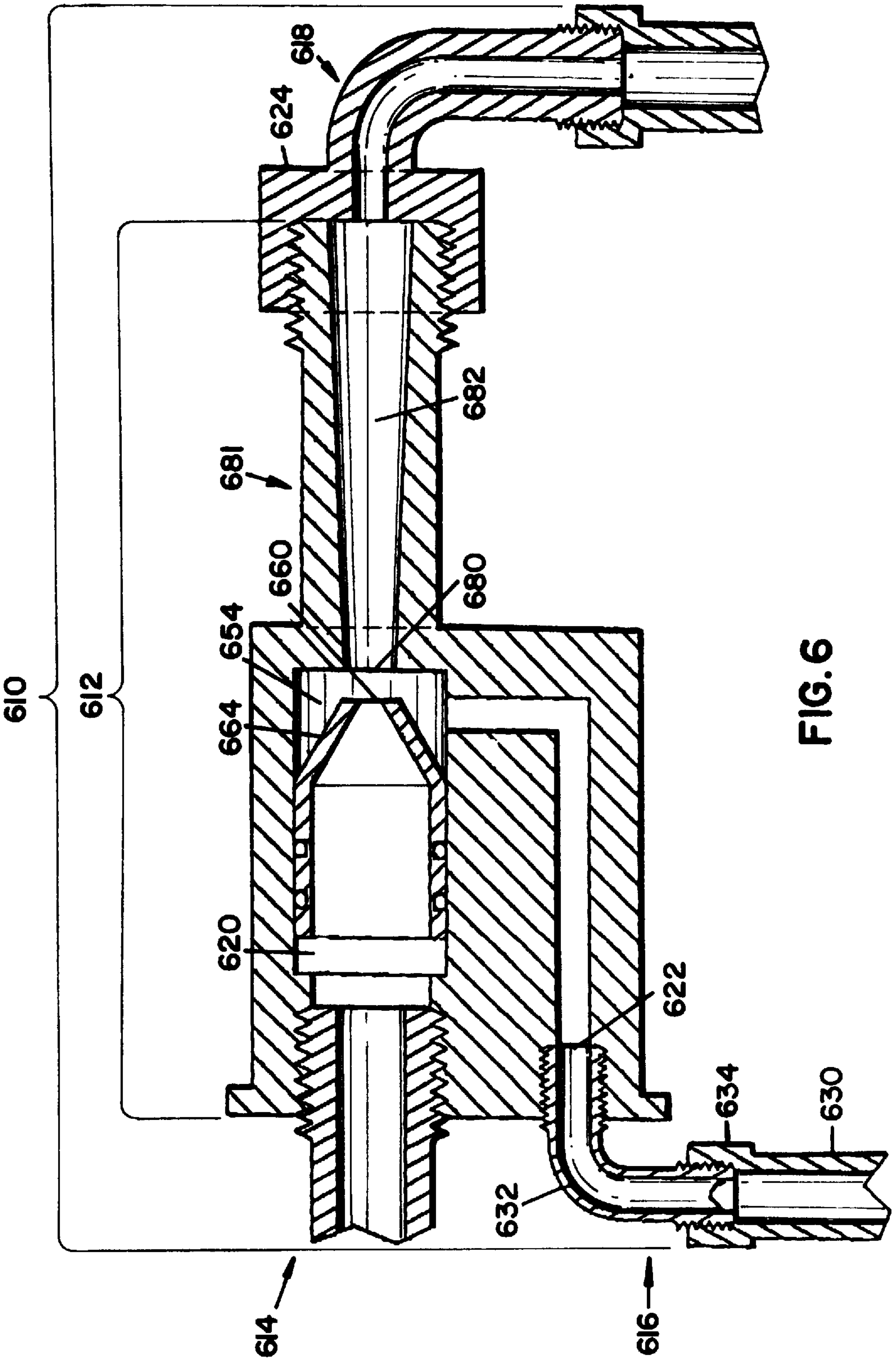
FIG. 6 is a partially cross-sectional view of a preferred embodiment of the apparatus of the invention.

Referring to FIG. 6 of the drawings, a preferred embodiment illustrative of the apparatus of the present invention for diluting a liquid concentrate with a liquid diluent is indicated generally at 610. The apparatus 610 can be installed with flow through the aspirator 612 and diffuser 682 in a generally horizontal aspect. The apparatus includes an aspirator assembly 612 operatively connected and in fluid communication with a liquid diluent conducting means 614 (e.g., a conduit such as a pipe for supplying deionized water, tap water or other aqueous liquid), a liquid concentrate conducting means 616 (e.g., a conduit such as a pipe for supplying a relatively viscous liquid concentrate), and a liquid product conducting outlet means 618 which can include a conduit such as a pipe. The aspirator 612 has diluent inlet port 620 for connecting to and in fluid communication with the diluent conducting means 614, and one or more concentrate inlet ports 622 for connecting and in fluid communication with the concentrate conducting means 616, and an outlet port 624 for conducting and in fluid communication with the liquid conducting outlet means 618.

The liquid diluent conducting means 614 supplies diluent, aqueous diluent or deionized water under adequate venturi enabling pressure of, for example, 10 to 60 psig is workable, preferably 20 to 40 psig ($1\times10^5$ Newtons/$m^2$), while 10 to 15 psig can be tolerated. The water pressure preferably is regulated by a water pressure regulator upstream thereof. Referring to FIG. 6, the liquid concentrate conducting means 616 of the preferred embodiment preferably has a pipe 630 (tubing or other conduits can also be used) operatively connected to and in fluid communication with the liquid concentrate in the aspirator 612 via an L-shaped connector 632.

Diaphragm flow preventer or valve 634 is in the pipe 630 distal to or upstream from the aspirator 612. The size of the diaphragm 634, pipe 630, and the L-shaped connector 632 are selected to reduce, and preferably minimize, the pressure loss (pressure drop) between the diaphragm 634 and the inlet 622, in the apparatus 610 during transportation of the liquid concentrate therethrough. Depending on the orientation of the apparatus 610 and the application, the L-shaped connector 632 is optional. For example, the pipe 630 and the L-shaped connector 632 can be replaced with a flexible tubing to provide a smooth and gradual curve so as to reduce the pressure loss due to sudden changes of flow direction caused by the change of the internal diameter of the components. Preferably, the internal diameter of the liquid concentrate conducting means 616 is substantially greater than the inlet port 622 for the liquid concentrate, most preferably the diameter ratio is ≦1.25:1. Preferably, the length of the liquid concentrate conducting means 616 is minimized to reduce pressure drop or pressure loss during fluid flow therein.

Referring again to FIG. 6, the liquid diluent conducting means 614 is connected and in fluid communication with the inlet port 620 of the aspirator 612. The liquid diluent conducting means 614 is sized so that the liquid diluent at the inlet port 620 of the aspirator 612 has sufficient pressure to force a jet of liquid diluent to exit the nozzle 664 at a velocity adequate for causing aspiration of the liquid concentrate through the liquid concentrate conducting means 616. A supply of liquid diluent is connected to inlet port 620 to supply the aspirator 612 preferably between 20 to 40 psig.

The aspirator 612 has an outlet portion 681 oriented generally in the same direction as the flow of the liquid diluent and perpendicular to the direction of the flow of liquid concentrate into the aspirator. In the aspirator 612 is also a chamber 654 connected to and in fluid communication with the liquid diluent inlet port 620, the liquid concentrate inlet port 622, and the outlet portion 681. The outlet portion 681 of the aspirator 612 has a throat 680 and a diffuser defining a passageway 681 having a diffuser portion 682 corresponding to the throat and diffuser of the aspirator. The end of the diffuser 682 distal to the chamber 654 is proximate the outlet port 624 of the aspirator. The conical nozzle 664 is disposed in the aspirator 612 downstream and proximate the liquid diluent conducting means 614 of the aspirator so that the liquid diluent enters the chamber 654 axially through the nozzle outlet 660. The outlet 660 has the same size ratio to the throat 680 as discussed above in FIG. 1.

Figure 7:
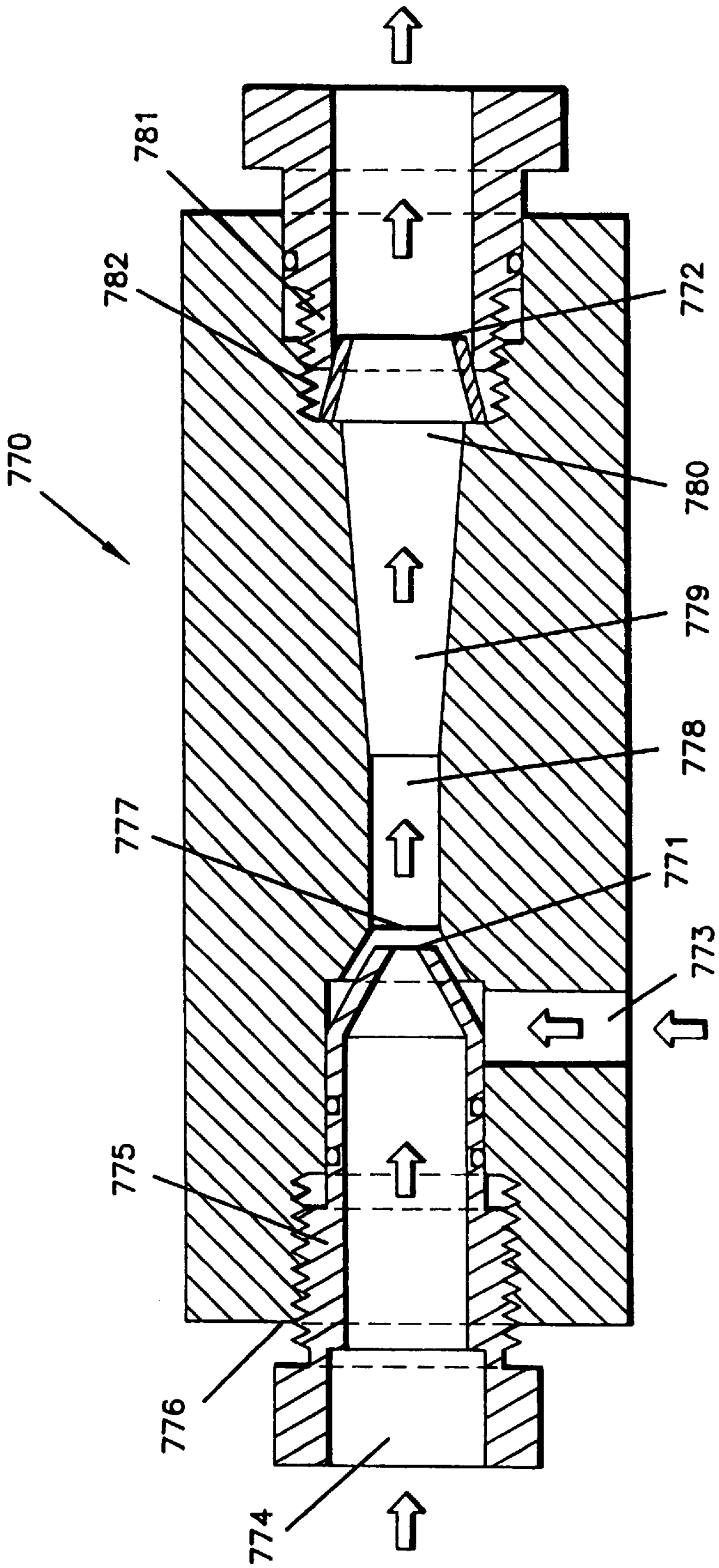
FIG. 7 shows a cross-sectional view of an adjustable aspirator of the invention containing an adjustable nozzle and an adjustable flow altering means ensuring the creation of a stable dynamic fluid seal.

FIG. 7 is a cross-sectional view of an aspirator 770, having a fixed nozzle diameter with an adjustable nozzle 771 to throat 777 distance and a metering means 772 with an adjustable diameter that can be used to vary the apparatus aspiration and dilution properties of a liquid concentrate by a diluent, compensate for variation in viscosity and water pressure and to stabilize fluid flow during dilution operations. The metering means 772 is a hollow truncated cone that reduces in internal diameter as the 781 is turned in. The truncated cone can be slotted. The longitudinal slots are formed in the truncated portion to increase flexibility of the cone and to result in a smaller final diameter of the metering means 772. The aspirator has a source of liquid concentrate 773 and a source of liquid diluent typically water, preferably deionized water 774. The liquid concentrate is drawn and liquid diluent are mixed by the action of the aspirator nozzle 771 directing a flow of liquid diluent axially into the concentrate at the throat 777 and passageway 778. The distance from the nozzle outlet 771 to the throat 777, can be varied by adjustment means, preferably an adjustment screw 775. As the adjustment screw 775 is advanced or retracted in the receiving screw portion 776, the distance of the nozzle opening 771 to the throat opening 777 is made smaller (the adjustment screw is advanced in the direction of flow) or made larger (the adjustment screw is withdrawn in an opposite direction to the flow). The variation in distance from nozzle 771 to throat 777 permits control over dilution ratio of the concentrate to diluent. The variation in this distance permits the aspirator to be adapted to a broad range of concentrate viscosity and diluent source pressure. A further benefit of the variable distance is the ability to select a preferred concentration dilution ratio that can range from about 0.01 to 90 parts concentrate per part of diluent, 0.5 to 60 parts of liquid concentrate per 100 parts of liquid diluent. Depending on other adjustable aspects of the aspirator of the invention, the dilution ratio can be about 10 to 40 parts of concentrate per 100 parts of diluent and most preferably about 18 to 28 parts of concentrate per each 100 parts of diluent. The liquid diluent passing through nozzle 771 into throat 777, by action of the aspirator, draws liquid concentrate through 773 into throat 777 and into passageway 778 and diffuser 779. In the passageway 778 and diffuser 779, the diluent and concentrate mix to uniform high viscosity use solution. The use solution has a viscosity substantially greater than either the liquid concentrate or diluent material. The operation of the aspirator of the invention is optimized when the passageway 778 and diffuser 779 are filled with use solution. In this embodiment of the invention, the ratio of the diameter of the throat portion 777 receiving the flow of liquid diluent from the nozzle opening 771 is greater than 1.4:1, preferably greater than about 2.0:1 and most preferably from about 2.5–3.5:1. In high viscosity regime of the operation of the aspirator of the invention, the passageway and diffuser segment are filled if the metering means 772 of the aspirator has a diameter or area smaller than the outlet 780 of the diffuser. In the adjustable aspirator of the invention, the diameter or area of the metering means 772 can be adjusted to stabilize fluid flow through the aspirator in response to the viscosity of the use solution and the pressure of the diluent flow. The adjustment of the area or diameter of the metering means can be adjusted through any known mechanical adjustment means, however, when preferred means involve a metering means manufactured of a flexible resilient material that can be reduced in size by the action of a screw adjustment 781 in the screw receiving means 782. As the screw adjustment is withdrawn in the direction of fluid flow, the area or diameter of the metering means enlarges. As the screw adjustment is moved in a direction opposite that of fluid flow, the diameter or area of the metering means is made smaller. The optimum area or diameter of the metering means is first selected to ensure that the throat and diffuser are filled with use solution during operations. However, after adequate and consistent dilution is obtained, the diameter or ratio of the metering means can be adapted to optimize fluid flow without adversely affecting consistency of dilution or interrupting consistent dilution.

FIG. 8 shows an alternative aspirator configuration to promote the creation of dynamic liquid seal filling the throat and passageway portion of the dispenser configuration. The aspirator 800 contains an inlet for diluent 801 terminating in a nozzle outlet 802 directing diluent into the throat 803 of the passageway 804 which flows into the diffuser 805. Liquid concentrate enters the aspirator at liquid concentrate inlet 806 and flows into an aspirator chamber 807 drawn by the flow of liquid diluent from nozzle 802. The flow of liquid diluent draws the liquid concentrate through the throat 803 into the passageway 804 which then flows into the diffuser 805 in a non-axial manner. In this preferred embodiment of the aspirator, the axis of the opening to the throat 803 is offset from the axis of the nozzle outlet 802 and the resulting flow is offset from the axis of the throat 803. In typical dispensers of the prior art, the nozzle opening axis 802 is aligned at the axis or center of the circular throat opening 803 and the flow is axial in the nozzle 803 and throat 804. In the preferred embodiment of the aspirator of FIG. 8, the opening and resulting flow is displaced from the center of the circular throat. We have found that such an axial offset of fluid flow or nonaxial flow enhances the creation of the liquid dynamic seal and ensures filling of the throat and diffuser portion. By offset we mean that the defined axis line 809 of the nozzle 802 and inlet 801 and the axis or center point of the diluent stream does not contact the defined axis line 810 or center point of the circular throat opening, but contacts an imaginary radius drawn from the axis or center of the throat 803 to the circular throat wall 808. In the preferred embodiment of the aspirator of this invention, the nozzle opening 802 is generally smaller than the throat opening 803. The diameter ratio of the throat opening 803 to the diameter of the nozzle opening 802 is typically greater than 1.4:1, typically greater than 2.0:1 and is preferably between about 2.2 and 3.5:1.

FIG. 9 is a cross-sectional view of an alternative aspirator of the invention. In the aspirators of the prior art, the geometry of the throat and throat inlet of a dispenser is typically concentric or parallel to the flow of liquid diluent and is parallel or axial with the flow. In such dispensers the turbulence of the flow is minimized by the concentricity of the walls of the throat to the diluent flow. In the aspirator of the invention, the walls of the throat are placed at an angle X to the axis flow of diluent. In an aspirator having such an angled throat, the aspirator 900 comprises an input for aqueous diluent 901 and a nozzle outlet 902 for the diluent. The diluent after leaving the nozzle outlet 902 enters a throat 903 and continues through a passageway 904 into a diffuser section 905. Such an aspirator has a defined axial center reference 906. Such a center reference is an axis line drawn through the aspirator connecting the center of the nozzle opening 902 and the circular input 901. The axial center reference line 906 passes through the throat and passageway 904 into the diffuser 905. The walls 907 of the passageway 904 form a generally cylindrical cross-section. However, the walls 907 and an axis line 908 of the passageway 904 are offset and at an angle X to the axial center reference 906 line of the aspirator. The offset angle X is greater than 0° to the axial reference line 906. Preferably the angle X is greater than 2° and most preferably greater than 5°. We have found the angled offset or angled flow enhances creation of the dynamic liquid seal and ensures filling of the throat and diffuser.

FIG. 10 graphically represents the dilution ratio obtained as the distance from the nozzle opening (e.g. nozzle 60, FIG. 1 or nozzle 771, FIG. 7), to the throat (e.g. throat 80, FIG. 1 or throat 777, FIG. 7) changes. The adjustable aspirator shown in FIG. 7 having a variable nozzle/throat distance was used in generating the data of FIGS. 10 and 11. As the nozzle is first withdrawn from the throat, the nozzle produces a use solution having very little concentrate. As the nozzle continues to be withdrawn the aspirator draws more concentrate. The diluent ratio can vary from 0.01 to 90 parts concentrate per one hundred parts diluent, preferably 0.5 to 60 parts concentrate per one hundred parts diluent, 0.1 to 25 wt % depending on the chemistry of the use solution.

The following examples illustrates the use of the apparatus of the present invention in diluting and dispensing chemical concentrates as a viscous use solution.

Example 1

| Ingredient | Wt % | Grams |
|---|---|---|
| Propylene Glycol | 25 | 375 |
| LAS Acid | 30 | 450 |
| AMP 95 | 9 | 135 |
| Barlox 12 | 20 | 300 |
| Steol CS-460, 60% | 0 | 0 |
| Monamide 1113 | 12 | 180 |
| Water | 3 | 45 |
| Salt (NaCl) | 1 | 15 |
| Total | 100 | 1500 |

-continued

| Temperature °F. | Concentrate Viscosity | Dilution[1] Viscosity |
|---|---|---|
| 126 | 92 cP at 12 RPM | |
| 91 | 159 cP at 12 RPM | |
| 72 | 225 cP at 12 RPM | 4:1 370 cP<br>5:1 572 cP |
| 99 | 124 cP at 12 RPM[2] | |

Steol CS-460 is Sodium lauryl ether ethoxylate sulfate
SXS, 40% is Sodium Xylene Sulfonate
LAS acid is Linear Dodecyl Benzene Sulfonic acid
AMP 95 is 2-Aminomethylpropanol
Barlox 12 is Lauryl Dimethylamine oxide
Amide 1113 is Coconut Diethanolamide
% indicates aqueous active concentration
[1]Dilution ratio is four or five parts diluent per part of concentrate.

Example 2

| Ingredient | Wt % | Grams |
|---|---|---|
| Propylene Glycol | 15 | 150 |
| LAS Acid | 30 | 300 |
| AMP 95 | 9 | 90 |
| Barlox 12 | 20 | 200 |
| Steol CS-460 | 12 | 120 |
| Amide 1113 | 10 | 100 |
| Water | 3 | 30 |
| Salt (NaCl) | 1 | 10 |
| Total | 100 | 1000 |

| Temperature °F. | Concentrate Viscosity[3] | Dilution Viscosity |
|---|---|---|
| 75 | 206 cP at 100 RPM | |
| 70 | 240 cP at 100 RPM | 805 cP at 4:1<br>366 cP at 5:1 |

[2]Brookfield Viscosity 15 12 rpm, 220° C., #3 spindle.
[3]Brookfield Viscosity at 100 rpm, 22° C., #3 spindle.

Example 3

| Ingredient | Wt % | Grams |
|---|---|---|
| Propylene Glycol | 15 | 225 |
| LAS Acid | 30 | 450 |
| AMP 95 | 9 | 135 |
| Barlox 12 | 20 | 300 |
| Steol CS-460 | 12 | 180 |
| Amide 1113 | 10 | 150 |
| Water | 3 | 45 |
| Salt (NaCl) | 1 | 15 |
| Total | 100 | 1500 |

| Temperature °F. | Concentrate Viscosity[4] | Dilution Viscosity |
|---|---|---|
| 123 | 90 cP at 100 RPM | |
| 91 | 147 cP at 100 RPM | |
| 77 | 210 cP at 100 RPM | |
| 71 | 247 cP at 100 RPM | 4:1 568 cP at 50 RPM |
| 90 | 166 cP at 100 RPM | |

[4]Brookfield Viscosity at 100 rpm, 22° C., #3 spindle.

Examples 4A and 4B

| Pot and Pan Products | | | |
|---|---|---|---|
| 4A | | 4B | |
| Low Actives | wt-% | High Actives | wt-% |
| Soft Water | 43.897 | LAS acid | 30.000 |
| Sodium chloride | 12.000 | Propylene glycol | 25.000 |
| Steol CS-460, 60% | 28.800 | AMP 95, 95% | 9.000 |
| HF-066 | 10.800 | Barlow 12, 30% | 20.000 |
| SXS, 40% | 4.000 | Monamide 1113 | 12.000 |
| Fragrance | 0.500 | Soft water | 3.000 |
| Dye | 0.003 | Sodium chloride | 1.000 |
| Total | 100.000 | | 100.000 |

| Dispensing Preparation | | |
|---|---|---|
| Weight conc aspirated (gr) | 445 | 330 |
| Vol product (ml) | 1570 | 1500 |
| Percent Aspirated (wt/vol) | 28.3 | 22 |
| Viscosity[5] Concentrate (cP) | 167 | 233 |
| Viscosity Use Soln. (cP) | 483 | 333 |

All dispensing tests done at 40 psig using city water
Steol CS-460 is Sodium lauryl ether ethoxylate sulfate
HF - 066 is Coconut Diethanolamide
SXS, 40% is Sodium Xylene Sulfonate
LAS acid is Linear Dodecyl Benzene Sulfonic acid
AMP 95 is 2-Aminomethylpropanol
Barlox 12 is Lauryl Dimethylamine oxide
Amide 1113 is Coconut Diethanolamide
% indicates aqueous active concentration
[5]Brookfield viscosity taken at 22° C., 12 rpm, #3 spindle.

Example 4C–4E

Dispensing of Dilutable Pot n Pan based on Ex. 4A
Purpose - to get a 25% or less dilution of product through a dispenser.
Results - Tests done at 3 different water pressures for 15 seconds recording the amount of product dispensed and the total amount of ready-to-use made Formula.

| | 4C | 4D | 4E |
|---|---|---|---|
| Water = | 40 psi | 35 psi | 30 psi |
| (Formula) = | 1.486 lb. | 1.128 lb. | 0.878 |
| in 15 sec. | 1.392 | 1.104 | 0.938 |
| | 1.384 | 1.100 | 0.826 |
| weight of conc. | 1.42 lb/ | 1.089 lb/ | 0.880 lb/ |
| per lb. of product | 1750 ml | 1400 ml | 1250 ml |
| Dilution (w/v) | 36% | 36% | 32% |
| Pot N Pan Visc. | 1033 cP | 900 cP | 550 cP |

After this initial test, an inlet tip was made for the dispenser and upon retest:

| | |
|---|---|
| Pot n Pan | 40 psi only |
| (Formula) = | 0.722 lb. |
| | 0.702 |
| | 0.722 |
| | 0.715 lb/1500 ml. = 22% (TARGET RANGE) |

The Experiment shows that dilution rates can be controlled by adjusting inlet orifice.

Examples 5A–5C

These products can be diluted at lower weight/volume percents (such as 10, 20%) for greater viscosity increase.

| 5A Acidic | | 5B Caustic | | 5C Alkaline, non caustic | |
|---|---|---|---|---|---|
| Deionized water | 20.100 | Deionized water | 43.520 | Soft water | 42.962 |
| Dye | 0.200 | Bayhibit AM | 1.000 | Cocamidopropyl Betaine, 30% | 12.800 |
| Phosphoric acid (75%) | 36.700 | Sodium hydroxide, 50% | 20.000 | Steol CS-460, 60% | 3.200 |
| Citric acid (50%) | 13.000 | Sodium gluconate, 40% | 2.500 | Barlox 12, 30% | 3.200 |
| Arquad 16–29 | 12.000 | Supra 2, 30% | 3.000 | Versene 100, 40% | 4.000 |
| SXS, 40% | 18.000 | Dye | 0.100 | SXS, 40% | 13.000 |
| Total: | 100.000 | SXS, 40% | 12.880 | Fragrance | 0.320 |
| | | Aromox T-12, 62% | 5.000 | Dye | 0.018 |
| | | Arquad T-27W, 27% | 12.000 | Ammonium hydroxide | 3.500 |
| | | | 100.000 | Aromox T-12, 62% | 5.000 |
| | | | | Arquad T-27W, 27% | 12.000 |
| | | | | | 100.000 |

All dispensing tests done at 40 psig using city water.

| | 5A | 5B | 5C |
|---|---|---|---|
| Weight concentrate aspirated (gr) | 917 | 1039 | 882 |
| Vol product (ml) | 2000 | 2050 | 2100 |
| Dilution Percent (weight/vol) | 45.9 | 50.7 | 42 |
| Viscosity Concentrate (cP)* | 16.7 | 16.7 | 33.3 |
| Viscosity Diluted Product (cP) | 33.3 | 200 | 66.7 |

*Brookfield, 22° C., 12 rpm, #3 spindle.
Viscosity taken at 12 rpm, #3 spindle
Arquad 16–29 is N,N,N Trimethyl-1-Hexadecyl ammonium chloride
SXS, 40% is Sodium Xylene Sulfonate -continued Bayhibit AM is 1-Phosphono-butane-tricarboxylic acid-1,2,4
Supra 2 is Lauryl Dimethylamine Oxide
Aromox T-12 is a combination of:
40% N-Tallowalkyl-2,2 Iminobis Ethanol N Oxide
22.4% Dipropylene glycol monomethyl ether
Arquad T-27W is Trimethyltallow Quaternary Ammonium Chloride
Steol CS-460, 60% is Sodium lauryl ether ethoxylate sulfate
Barlox 12 is Lauryl Dimethylamine Oxide
Versene 100 is Tetrasodium Ethylenediaminetetraacetate

Example 6

Other Dilutable Products

| Hand Soap | | Acid Cleaner | |
|---|---|---|---|
| Soft water | 36.517 | Soft water | 55.799 |
| Sodium chloride | 10.000 | Potassium hydroxide, 45% | 5.910 |
| SXS, 40% | 4.000 | EDTA acid powder | 0.450 |
| Propylene glycol | 4.000 | Dequest 2000, 50% | 0.100 |
| IPA, 99% | 1.000 | Phosphoric acid | 2.550 |
| Steol CS-460, 60% | 22.500 | Barlox 12, 30% | 2.000 |
| HF-066 | 6.000 | Sodium silicate | 0.900 |
| PCMX (or Irgasan) | 1.200 | SXS, 40% | 7.000 |
| Bioterge AS-40, 40% | 13.500 | Dowanol PM (solvent) | 2.680 |
| Glycerin, 96% | 0.600 | Dowanol DPM (solvent) | 1.780 |
| Dyes | 0.005 | Dowanol DM (solvent) | 2.680 |
| Fragrance | 0.500 | Aromox T-12, 62% | 4.000 |
| Citric acid, 50% | 0.178 | Soft water | 1.350 |
| Total: | 100.000 | Dye | 0.001 |
| | | | 100.000 |

All dispensing tests done at 40 psig using city water

| | Hand Soap | Acid Cleaner |
|---|---|---|
| Weight conc aspirated (gr) | 464 | 544 |
| Vol product (ml) | 1600 | 1600 |
| Percent (weight/vol) | 29 | 34 |
| Viscosity[6] Conc (cP) | 100 | 250 |
| Viscosity Use (cP) | 550 | 1183 |

SXS, 40% is Sodium xylene sulfonate
IPA is Isopropanol
Steol CS-460, 60% is Sodium lauryl ether ethoxylate sulfate
HF 066 is Coconut Diethanolamide
PCMX is 4-chloro-3,5-xylenol
Irgasan is 2,4,4 Trichloro-2-Hydroydiphenyl ether
Bioterge AS-40 is Sodium C12–C14 alpha olefin sulfonate
EDTA acid is Ethylenediaminetetraacetic acid
Dequest 2000 is Triphosphono Methyl amine
Barlox 12 is Lauryl Dimethylamine oxide
Dowanol PM is Propylene glycol monomethyl ether
Dowanol DPM is Dipropylene glycol monomethyl ether
Dowanol DM is Dipropylene glycol monomethyl ether
Aromox T-12 is a combination of:
40% N-Tallowalkyl-2,2 Iminobis Ethanol N Oxide
22.4% Dipropylene glycol monomethyl ether
Arquad T-27W is Trimethyltallow alkyl Quaternary Ammonium Chloride
[6]Brookfield viscosity at 22° C., #3 spindle and 10 rpm.

Example 7

Dispensing of Viscous Solution from Concentrate #2

The apparatus of the invention (see FIG. 1) was used to dispense a use solution by diluting a liquid concentrate #2 having a composition shown in table below. The liquid concentrate had a Brookfield viscosity at 22° C. of 225 cP at 100 rpm using spindle #3. The liquid diluent supply was city water at 22° C. and 15 psig pressure ($1\times10^5$ Newtons/$M^2$)

| Ingredient | Wt % | Grams |
|---|---|---|
| Propylene Glycol | 25 | 375 |
| LAS Acid | 30 | 450 |
| AMP 95 | 9 | 135 |
| Barlox 12 | 20 | 300 |
| Steol CS-460 | 0 | 0 |
| Amide 1113 | 12 | 180 |
| Water | 3 | 45 |
| Salt | 1 | 15 |
| Total | 100 | 1500 |

The batches of products were made in a manner similar to Example 1. The results of the runs in making the batches were listed in table below, which shows that the dispenser was effective to dilute the liquid concentrate into immersed viscous use solutions at various dilution rates by adjusting the diluent flow rate.

Product of Dilution of Concentrate #2

| Batch No. | Amount of Product | Amount of Conc #2 | Conc #2 on Product % | Diluent on Conc #2 Ratio | Product Viscosity (cP) |
|---|---|---|---|---|---|
| 1 | 894.95 | 141.25 | 15.78 | 5.34 | 354 |
| 2 | 983.02 | 129.4 | 13.16 | 6.60 | 352 |
| 3 | 627.67 | 72 | 11.47 | 7.72 | 92 |
| 4 | 538 | 75 | 13.94 | 6.17 | 378 |
| 5 | 726.12 | 100 | 13.77 | 6.26 | 345 |

Liquid concentrates that can be diluted into use solutions by the apparatus of the present invention.

Example 8A–8C

| 8A Acidic Concentrate | | 8B Non-Caustic, Alkaline | | 8C Caustic | |
|---|---|---|---|---|---|
| Water | 20.1% | Water | 42.962% | Water | 43.52% |
| Acid Blue #9 (1%) | 0.2% | Cocamidopropyl Betaine | 12.800% | Bayhibit AM | 1.00% |
| Phosphoric Acid (75%) | 36.7% | Steol CS-460, 60% | 3.200% | NaOH (50%) | 20.00% |

-continued

| 8A Acidic Concentrate | | 8B Non-Caustic, Alkaline | | 8C Caustic | |
|---|---|---|---|---|---|
| Citric Acid (50%) | 13.0% | Supra 2 | 3.200% | Sodium Gluconate (40%) | 2.50% |
| Arquad 16–29 | 12.0% | Versene 100 | 4.000% | Supra 2 | 3.00% |
| SXS (40%) | 18.0% | SXS (40%) | 13.000% | Fluorescein Dye | 0.10% |
| | | D-Limonene | 0.320% | SXS (40%) | 12.88% |
| | | Fluorescein Dye | 0.018% | Aromos T-12 | 5.00% |
| | | Ammonium Hydroxide | 3.500% | Arquad T-27W | 12.00% |
| | | Aromox T-12 | 5.000% | | |
| | | Arquad T-27W | 12.000% | | |
| | 50 RPM | | 50 RPM | | 50 RPM |
| 100% Viscosity | 20.8 cP | 100% Viscosity | 45.6 cP | 100% Viscosity | 25.6 cP |
| 20% Viscosity | 150.0 cP | 20% Viscosity | 326.0 cP | 20% Viscosity | 433.6 cP |
| 10% Viscosity | 60.0 cP | 10% Viscosity | 121.0 cP | 10% Viscosity | 133.2 cP |

These compositions, Examples 9 and 10, are adapted to have maximum thickening effects when diluted to about 15–25 wt % with water.

Examples 9A–9E

| RAW MATERIAL | 9A | 9B | 9C | 9D | 9E |
|---|---|---|---|---|---|
| Water | 31.1 | 40.1 | 37.1 | 41.1 | 42.6 |
| Acid Blue Dye #9 (1%) | 0.2 | 0.2 | 0.2 | 0.2 | 0.2 |
| Phosphoric Acid (75%) | 36.7 | 36.7 | 36.7 | 36.7 | 36.7 |
| Citric Acid (50%) | 13.0 | 13.0 | 13.0 | 13.0 | 13.0 |
| Arquad 16- | 3.0 | 5.0 | 3.0 | 3.0 | 3.0 |
| SXS (40%) | 3.0 | 5.0 | 10.0 | 6.0 | 4.5 |
| Total | 100.0 | 100.0 | 100.0 | 100.0 | 100.0 |

Arquad 16: Trimethyl-hexadecyl-ammonium chloride SXS, 40%: Sodium xylene sulfonate

| Conc. | Viscosity Stability | 9A | 9B | 9C | 9D | 9E |
|---|---|---|---|---|---|---|
| 125 Oz/Gal | Initial 50 RPM | 45.2 | 45.0 | 16.0 | 17.0 | 20.4 |
| | 24 Hrs. 50 RPM | | 54.0 | 15.0 | 21.6 | 20.6 |
| 32 Oz/Gal | Initial 50 RPM | 43.5 | 54.4 | 22.8 | 27.2 | 34.2 |
| | 24 Hrs. 50 RPM | | | | | |
| 16 Oz/Gal | Initial 50 RPM | 34.0 | 35.4 | 13.0 | 15.5 | 22.0 |
| | 24 Hrs. 50 RPM | 33.4 | 35.4 | 11.8 | 11.0 | 20.0 |
| | 24 Hrs. 20 RPM | 20.0 | 20.0 | 7.0 | 11.5 | 13.5 |
| | 24 Hrs. 10 RPM | 15.0 | 25.0 | 4.0 | 11.0 | 11.0 |
| 8 Oz/Gal | Initial 50 RPM | 12.4 | 27.8 | 9.0 | 15.8 | 21.0 |
| | 24 Hrs. 50 RPM | 17.5 | 27.6 | 7.6 | 16.0 | 12.4 |
| | 24 Hrs. 20 RPM | 11.0 | 21.0 | 4.0 | 7.0 | 8.5 |
| | 24 Hrs. 10 RPM | 7.0 | 15.0 | 0.0 | 4.0 | 5.0 |

Example 10

| Ingredient | Wt % |
|---|---|
| Propylene Glycol | 19.0 |
| LAS Acid 97% | 30.0 |
| AMP 95 | 9.0 |
| Barlox 12, 30% | 20.0 |
| Steol CS-460, 60% | 6.0 |
| Monamide 1113 | 12.0 |
| Soft Water | 3.0 |
| NaCl | 1.0 |

Initial Viscosity 45 cP
Conditions:
- Pressure: 15 psi
- Spindle: 3
- RPMs: 10
- Dilutions with City Water

| Ex. 10 Conc. Weight Change (g) | Diluted Weight Change (g) | Product Conc. (%) | Product Viscosity (cP) | Product Temp. (F.) |
|---|---|---|---|---|
| 208.9 | 862.5 | 24.0 | 90 | 67.4 |
| 103.5 | 741.6 | 13.96 | 100 | 66.6 |
| 122.2 | 854.3 | 14.3 | 190 | 66.7 |
| 106.5 | 736.1 | 14.47 | 190 | 68.6 |
| 174.2 | 779.3 | 22.4 | 480 | 72.7 |
| 192.0 | 881.0 | 21.79 | 690 | 68.3 |
| 181.8 | 812.9 | 22.36 | 710 | 65.8 |
| 168.2 | 776.0 | 21.7 | 780 | 68.8 |
| 160.2 | 755.9 | 21.19 | 700 | 69.3 |
| 153.7 | 744.9 | 20.63 | 830 | 68.0 |

Example 11

A product like that of Example 1 (initial viscosity 91 cP) was dispensed with the adjustable dispenser. The distance between the nozzle and the throat was adjusted. The distance between throat and nozzle—3⅓ revolutions outward was 0.070 mm. The dispensing properties were as reported below:

| Conc. d Weight (g) | Diluted d Weight (g) | Product Conc. (%) | Product Viscosity (cps) | Dispense Time (sec.) | Dispense Volume (mls) | Product Temp. (F) |
|---|---|---|---|---|---|---|
| 107.3 | 978.0 | 10.97 | 190 | — | 1050 | 52.0 |
| 105.2 | 861.4 | 12.21 | 146 | 12.57 | 950 | 53.0 |
| 104.1 | 861.6 | 12.08 | 130 | 12.50 | 950 | 54.5 |
| 122.6 | 962.0 | 12.74 | 140 | 14.06 | 1050 | 52.3 |

-continued

| Conc. d Weight (g) | Diluted d Weight (g) | Product Conc. (%) | Product Viscosity (cps) | Dispense Time (sec.) | Dispense Volume (mls) | Product Temp. (F) |
|---|---|---|---|---|---|---|

Note: If more than a 30–60 second wait after shutting off water, venturi would not pull a vacuum.

The distance between throat and nozzle was increased—5 revolutions or 2.6 mm. The dispensing properties were as follows:

| Conc. d Weight (g) | Diluted d Weight (g) | Product Conc. (%) | Product Viscosity (cps) | Dispense Time (sec.) | Dispense Volume (mls) | Product Temp. (F) |
|---|---|---|---|---|---|---|
| 188.9 | 848.5 | 22.26 | 374 | — | 850 | 68.4 |
| 160.4 | 796.0 | 20.15 | 502<br>(486) | — | 850 | 65.0<br>(66.4) |
| 154.0 | 816.2 | 18.87 | 676<br>(522) | — | 900 | 59.8<br>(65.0) |
| 156.4 | 871.3 | 17.95 | 816<br>(562) | — | 950 | 58.1<br>(64.8) |

Note: Viscosity denoted in parenthesis is after product de-aerated

The distance between throat and nozzle was again increased—7 revolutions or 3.70 mm. The following properties resulted.

| Conc. d Weight (g) | Diluted d Weight (g) | Product Conc. (%) | Product Viscosity (cps) | Dispense Time (sec.) | Dispense Volume (mls) | Product Temp. (F) |
|---|---|---|---|---|---|---|
| 245.5 | 1013.6 | 24.22 | 452<br>(392) | — | 1075 | 59.3<br>(64.4) |
| 174.0 | 835.2 | 20.83 | 582<br>(452) | — | 925 | 57.6<br>(63.3) |
| 203.4 | 889.8 | 22.63 | 560 | — | 950 | 58.4 |
| 188.3 | 824.4 | 22.84 | 598 | — | 850 | 58.3 |

Note: Viscosity denoted in parenthesis is after product de-aerated.

The present invention has been described in the foregoing specification. The embodiments are presented for illustrative purposes only, and are not to be interpreted as limiting the scope of the invention. Modifications and alterations of the invention, especially in sizes and shapes, can be made without departing from the spirit and scope of the invention. Also, the length of the throat and the angle of divergence in the diffuser can be different from the examples described in the foregoing. The diluent can be a solution instead of water. The invention resides in the appended claims.

We claim:

1. An apparatus for diluting a liquid concentrate with a liquid diluent to form a use solution, the apparatus comprising:

(a) an aspirator comprising a first inlet port for receiving a stream of the liquid diluent said diluent at water service line pressure of less than about 60 psi, a nozzle opening for the liquid diluent, a second inlet port for receiving a stream of the liquid concentrate having a viscosity of about 10 to 1000 cP, and an outlet port for the use solution having a viscosity of about 100 to 4000 cP;

(b) liquid diluent conducting means connected to the first inlet port and liquid concentrate conducting means connected to the second inlet port of the aspirator for supplying thereto the liquid diluent and the liquid concentrate respectively; and (c) a liquid conducting outlet means having a throat and a passageway connected to the outlet port for dispensing the use solution having a viscosity greater than the liquid concentrate, from the apparatus;

wherein the use solution has a higher viscosity than the concentrate or the diluent, the ratio of the diameter of the opening to the throat and the passageway to the diameter of the nozzle opening is greater than 1.4:1 and the liquid conducting outlet means comprises flow restriction means having a diameter smaller than the diameter of the passageway causing the passageway to fill with use solution.

2. The apparatus of claim 1 wherein the ratio of the diameter of the opening to the passageway to the diameter of the opening of the nozzle is greater than 1.6:1.

3. The apparatus of claim 1 wherein the outlet port and the liquid conducting outlet means are shaped and configured to maintain during dispensing a dynamic volume of use solution within the outlet port and the liquid conducting outlet means, sufficient to maintain continuous dispensing and a consistent concentrate to diluent ratio, and are sized in relation to the flow rate of the liquid diluent and in relation to the flow rate of the liquid concentrate, through the first inlet port and the second inlet port, such that the flow rate of the use solution from the apparatus is substantially unaffected by the viscosity of use solution.

4. The apparatus of claim 1 wherein the ratio of the diameter of the opening to the passageway to the diameter of the opening of the nozzle is between 1.8 and 3.0:1.

5. The apparatus of claim 1 wherein the nozzle opening is about 3 to 10 mm.

6. The apparatus of claim 1 wherein the diameter of the liquid conducting outlet means to the internal diameter of the flow restriction means is about 1.3:1 to 3.5:1.

7. The apparatus of claim 1 wherein the liquid concentrate comprises about 40 to 90 wt % active ingredients in an aqueous solution.

8. The apparatus of claim 1 wherein the use solution comprises about 10 to 25 wt % actives in an aqueous solution.

9. The apparatus according to claim 1 wherein the liquid concentrate has a viscosity of about 10 to 600 cP at about 22° C. and the use solution has a viscosity of 100 to 2000 cP at about 22° C.

10. The apparatus of claim 1 wherein the liquid diluent is at a line pressure of about 10–60 psig.

11. The apparatus of claim 1 wherein the liquid diluent is at a line pressure of about 20–40 psig.

12. The apparatus of claim 1 wherein the distance from the nozzle opening to the throat is about 0.1 to 10 mm.

13. The apparatus according to claim 1 wherein the liquid concentrate conducting means has a check valve.

14. The apparatus according to claim 13 wherein the check valve is a diaphragm valve.

15. The apparatus of claim 1 wherein the liquid concentrate has a viscosity of about 100 to 400 cP at about 22° C. and the use solution has a viscosity of about 200 to 1200 cP at about 22° C.

16. The apparatus of claim 1 wherein the liquid diluent is deionized water.

17. The apparatus of claim 1 wherein the liquid concentrate comprises an aqueous liquid containing a surfactant.

18. The apparatus of claim 13 wherein the aqueous concentrate additionally comprises a source of alkalinity.

19. The apparatus of claim 13 wherein the aqueous concentrate additionally comprises a source of acidity.

20. An apparatus for diluting a liquid concentrate with a liquid diluent to form a use solution, the apparatus comprising:

(a) an aspirator comprising a first inlet port for receiving a stream of the liquid diluent said diluent at water service line pressure less than about 60 psi, a second inlet port for receiving a stream of the liquid concentrate having a viscosity of 10–600 cP at 22° C., a nozzle, and venturi comprising a nozzle opening, a throat facing the nozzle and a passageway terminating at an outlet port, wherein the ratio of the area of the throat to the area of the nozzle is greater than 4:1 and effective to cause the liquid concentrate to be aspirated and drawn through the apparatus;

(b) a liquid diluent conducting means connected to the first inlet port and a liquid concentrated conducting means having a valve, the liquid concentrate conducting means being connected to the second inlet port of the aspirator for supplying thereto the liquid concentrate at atmospheric pressure; and (c) a liquid conducting outlet means connected to the outlet port for delivering the use solution having a viscosity greater than the liquid concentrate, from the apparatus;

wherein the outlet port and the second liquid conducting means are adapted for use with a use solution having a viscosity of 200 to 1200 cP at 22° C., the use solution having a viscosity greater than the diluent and the concentrate, the outlet port and the liquid conducting outlet means are shaped and configured to maintain during dispensing a dynamic volume of use solution within the outlet port and the liquid conducting outlet means, sufficient to maintain continuous dispensing and a concentrate to diluent ratio of about 1 part of concentrate to about 3 to 6 parts of diluent, and are sized in relation to the flow rate of the liquid diluent and in relation to the flow rate of the liquid concentrate, through the first inlet port and the second inlet port such that the flow rate of the use solution from the apparatus is substantially unaffected by the viscosity of use solution.

21. The apparatus of claim 20 wherein the liquid concentrate comprises about 40 to 90 wt % active ingredients in an aqueous solution.

22. The apparatus of claim 20 wherein the use solution comprises about 10–25 wt % actives in an aqueous solution.

23. The apparatus according to claim 20 wherein the passageway terminating at an outlet port has an opening with an internal diameter effective to prevent the jet of the liquid diluent from exiting the outlet port without impacting the diverging portion of the passageway of the aspirator.

24. The apparatus according to claim 20 wherein the passageway terminating at an outlet port comprises a flow restricting means.

25. The apparatus of claim 20 wherein the liquid conducting outlet means further comprises a conduit connected downstream to the flow restriction means, the conduit having a diameter at least 1.5 times that of the flow restriction means.

26. The apparatus according to claim 20 wherein the liquid concentrate has a viscosity of about 100 to 400 cP at about 22° C.

27. The apparatus according to claim 20 wherein the use solution has a viscosity of about 200 to 1200 cP at 22° C.

28. The apparatus according to claim 20 wherein the flow restriction means comprises a cylindrical post.

29. The apparatus according to claim 20 wherein the flow restriction means comprises a wire insert.

30. The apparatus of claim 20 wherein the liquid concentrate comprises an aqueous liquid containing a surfactant.

31. The apparatus of claim 20 wherein the aqueous liquid additionally comprises a source of alkalinity.

32. The apparatus of claim 20 wherein the liquid concentrate additionally comprises a source of acidity.

33. A method of diluting an aqueous liquid concentrate having a viscosity of about 10–1000 cP with an aqueous liquid diluent to form an aqueous use solution having an increased viscosity, when compared to the concentrate, the method comprising:

(a) combining the liquid diluent said diluent at water service line pressure less than about 60 psi, with the liquid concentrate having a viscosity of about 10–1000 cP, in an aspirator device, to form a liquid use solution of increased viscosity when compared to the liquid concentrate; and (b) accumulating the aqueous use solution in a container in liquid communication with the aspirator;

wherein the viscosity of the use solution is greater than both the liquid concentrate and 200 cP.

34. The apparatus of claim 33 wherein the liquid concentrate comprises about 40 to 90 wt % active ingredients in an aqueous solution.

35. The apparatus of claim 33 wherein the use solution comprises about 10–30 wt % actives in an aqueous solution.

36. The apparatus of claim 33 wherein the use solution comprises about 10–25 wt % actives in an aqueous solution.

37. The method of claim 33 wherein the viscosity of the use solution is about 200–1200 cP.

38. The method of claim 33 wherein the viscosity of the use solution is about 400–1000 cP.

39. The method of claim 33 wherein the aqueous liquid diluent comprises deionized water.

40. The method of claim 33 wherein the aqueous concentrate comprises deionized water containing a surfactant composition.

41. The method of claim 33 wherein the aqueous concentrate additionally comprises a source of alkalinity.

42. The method of claim 33 wherein the aqueous concentrate additionally comprises a source of acidity.

43. An apparatus for diluting a liquid concentrate with a liquid diluent to form a use solution, the apparatus comprising:

(a) an aspirator comprising a first inlet port for receiving a stream of the liquid diluent said diluent at water service line pressure of less than about 60 psi, a nozzle opening for the liquid diluent having a diameter of about 1 to 6 mm, a second inlet port for receiving a stream of the liquid concentrate having a viscosity of about 10 to 1000 cP, and an outlet port for the use solution having a viscosity of about 100 to 4000 cP;

(b) liquid diluent conducting means connected to the first inlet port and liquid concentrate conducting means connected to the second inlet port of the aspirator for supplying thereto the liquid diluent and the liquid concentrate respectively; and (c) a liquid conducting outlet means having a throat and a passageway connected to an outlet port for dispensing the use solution having a viscosity greater than the liquid concentrate, from the apparatus;

wherein the use solution has a higher viscosity than the concentrate and the diluent, the ratio of the diameter of the opening to the throat and the passageway to the diameter of the nozzle opening is greater than about 1.4:1 and the liquid connecting outlet means comprises a variable flow restriction means having a diameter about 3 to 10 mm and smaller than the diameter of the passageway causing the passageway to fill with use solution.

44. The apparatus of claim 43 wherein the ratio of the diameter of the opening to the passageway to the diameter of the opening of the nozzle is greater than 1.6:1.

45. The apparatus of claim 43 wherein the outlet port and the liquid conducting outlet means are shaped and configured to maintain during dispensing a dynamic volume of use solution within the outlet port and the liquid conducting outlet means, sufficient to maintain continuous dispensing and a consistent concentrate to diluent ratio, and are sized in relation to the flow rate of the liquid diluent and in relation to the flow rate of the liquid concentrate, through the first inlet port and the second inlet port, such that the flow rate of the use solution from the apparatus is substantially unaffected by the viscosity of use solution.

46. The apparatus of claim 43 wherein the ratio of the diameter of the opening to the passageway to the diameter of the opening of the nozzle is between about 1.8 and 3.0:1.

47. The apparatus of claim 43 wherein the nozzle opening is about 1 to 6 mm.

48. The apparatus of claim 43 wherein the diameter of the liquid conducting outlet means to the internal diameter of the flow restriction means about 1.3:1 to 3.5:1.

49. The apparatus of claim 43 wherein the liquid concentrate comprises about 40 to 90 wt % active ingredients in an aqueous solution.

50. The apparatus of claim 43 wherein the use solution comprises about 10–25 wt % actives in an aqueous solution.

51. The apparatus according to claim 43 wherein the liquid concentrate has a viscosity of about 10 to 600 cP at about 22° C. and the use solution has a viscosity of 100 to 2000 cP at about 22° C.

52. The apparatus of claim 43 wherein the liquid diluent is at a line pressure of about 10–60 psig.

53. The apparatus of claim 43 wherein the liquid diluent is at a line pressure of about 20–40 psig.

54. The apparatus of claim 43 wherein the distance from the nozzle opening to the throat is about 0.1 to 10 mm.

55. The apparatus according to claim 43 wherein the liquid concentrate conducting means has a check valve.

56. The apparatus according to claim 55 wherein the check valve is a diaphragm valve.

57. The apparatus of claim 43 wherein the liquid concentrate has a viscosity of about 100 to 400 cP at about 22° C. and the use solution has a viscosity of about 200 to 1200 cP at about 22° C.

58. The apparatus of claim 43 wherein the liquid diluent is deionized water.

59. The apparatus of claim 43 wherein the liquid concentrate comprises an aqueous liquid containing a surfactant.

60. The apparatus of claim 43 wherein the aqueous concentrate additionally comprises a source of alkalinity.

61. The apparatus of claim 43 wherein the aqueous concentrate additionally comprises a source of acidity.

62. An aspirator adapted to dispense and dilute an aqueous concentrate with an aqueous diluent said diluent at water service line pressure less than about 60 psi to form a dilute use solution, the aspirator comprising a nozzle having a defined axial flow line, an outlet portion for the dilute use solution, an a throat having a defined axial flow line, the nozzle disposed in direct fluid communication with the throat, the axial flow line of the nozzle radially displaced, but parallel to, the axial flow line of the throat.

63. The aspirator of claim 62 wherein the ratio of the diameter of the opening to the throat to the diameter of the diameter of the nozzle is greater than about 1.4:1.

64. The apparatus of claim 62 wherein the viscosity of the liquid concentrate is about 10 to 1000 cP and the use solution has a viscosity of about 100 to 4000 cP.

65. An aspirator adapted to dispense and dilute an aqueous concentrate with an aqueous diluent to form a dilute use solution, the aspirator comprising a nozzle for the diluent and a throat for the dilute use solution, the flow of a diluent passing directly into the throat, the nozzle having a defined axial flow line and the throat having a throat wall defining an axial flow line, the nozzle in direct fluid communication with the throat, the axial flow line of the throat and throat wall being angularly displaced from the axial flow line of the nozzle at an angle greater than about 1°, and wherein the ratio of the diameter of the opening to the throat to the diameter of the nozzle is greater than about 1.4:1.

66. The aspirator of claim 65 wherein the angle is greater than about 3°.

67. The apparatus of claim 65 wherein the viscosity of the liquid concentrate is about 10 to 1000 cP and the use solution has a viscosity of about 100 to 4000 cP.

* * * * *